US012591876B2

(12) United States Patent
Pick et al.

(10) Patent No.: US 12,591,876 B2
(45) Date of Patent: Mar. 31, 2026

(54) SYSTEMS AND METHODS FOR LAUNCHING A MOBILE APPLICATION OR A BROWSER EXTENSION RESPONSIVE TO SATISFYING PREDETERMINED CONDITIONS

(71) Applicant: Capital One Services, LLC, McLean, VA (US)

(72) Inventors: Daniel Pick, Falls Church, VA (US); Zainab Zaki, Reston, VA (US); Dipukumar Muraleedharakumar, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/131,935

(22) Filed: Apr. 7, 2023

(65) Prior Publication Data

US 2024/0338676 A1      Oct. 10, 2024

(51) Int. Cl.
| | |
|---|---|
| *G06Q 20/34* | (2012.01) |
| *G06Q 20/32* | (2012.01) |
| *G06Q 20/40* | (2012.01) |
| *G06Q 30/0207* | (2023.01) |
| *G06Q 30/0601* | (2023.01) |

(52) U.S. Cl.
CPC ......... *G06Q 20/352* (2013.01); *G06Q 20/322* (2013.01); *G06Q 20/401* (2013.01); *G06Q 30/0207* (2013.01); *G06Q 30/0611* (2013.01); *G06Q 30/0633* (2013.01)

(58) Field of Classification Search
CPC .................................................... G06Q 20/352
See application file for complete search history.

(56) References Cited

U.S. PATENT DOCUMENTS

| | | | |
|---|---|---|---|
| 4,683,553 | A | 7/1987 | Mollier |
| 4,827,113 | A | 5/1989 | Rikuna |
| 4,910,773 | A | 3/1990 | Hazard et al. |
| 5,036,461 | A | 7/1991 | Elliott et al. |
| 5,363,448 | A | 11/1994 | Koopman, Jr. et al. |
| 5,377,270 | A | 12/1994 | Koopman, Jr. et al. |
| 5,533,126 | A | 7/1996 | Hazard |
| 5,537,314 | A | 7/1996 | Kanter |
| 5,590,038 | A | 12/1996 | Pitroda |
| 5,592,553 | A | 1/1997 | Guski et al. |
| 5,616,901 | A | 4/1997 | Crandall |

(Continued)

FOREIGN PATENT DOCUMENTS

| | | |
|---|---|---|
| CA | 3010336 A1 | 7/2017 |
| CN | 101192295 A | 6/2008 |

(Continued)

OTHER PUBLICATIONS

The International Search Report and Written Opinion mailed Jul. 15, 2024, for corresponding PCT/US2024/022998 (10 pages).

(Continued)

*Primary Examiner* — Edward Chang

(74) *Attorney, Agent, or Firm* — KDW Firm PLLC

(57) ABSTRACT
A mobile device can receive a cryptogram from a contactless card, verify the cryptogram, and when the cryptogram has been verified and a merchant mobile application is running on the mobile device, launch a shopping mobile application and/or a shopping browser extension on the mobile device.

16 Claims, 16 Drawing Sheets

1300

RECEIVING A CRYPTOGRAM FROM A CONTACTLESS CARD 1302

VERIFYING THE CRYPTOGRAM 1304

WHEN THE CRYPTOGRAM HAS BEEN VERIFIED AND A FIRST MOBILE APPLICATION IS RUNNING ON A MOBILE DEVICE, LAUNCHING A SECOND MOBILE APPLICATION OR A SHOPPING BROWSER EXTENSION ON THE MOBILE DEVICE 1306

(56) References Cited

U.S. PATENT DOCUMENTS

| | | | |
|---|---|---|---|
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,572,015 B1 | 6/2003 | Norton |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,252,242 B2 | 8/2007 | Ho |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,527,208 B2 | 5/2009 | Hammad |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,014 B1 * | 9/2012 | Bhosle ............... G06Q 30/0278 |
| | | 705/26.7 |
| 8,266,451 B2 | 9/2012 | Leydier et al. |
| 8,276,814 B1 | 10/2012 | Davis |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,346,670 B2 | 1/2013 | Hasson |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |

(56) References Cited

U.S. PATENT DOCUMENTS

| | | | |
|---|---|---|---|
| 8,511,542 B2 | 8/2013 | Pan | |
| 8,511,547 B2 | 8/2013 | Rans | |
| 8,519,822 B2 | 8/2013 | Riegebauer | |
| 8,559,872 B2 | 10/2013 | Butler | |
| 8,566,916 B1 | 10/2013 | Bailey et al. | |
| 8,567,670 B2 | 10/2013 | Stanfield et al. | |
| 8,572,386 B2 | 10/2013 | Takekawa et al. | |
| 8,577,810 B1 | 11/2013 | Dalit et al. | |
| 8,583,454 B2 | 11/2013 | Beraja et al. | |
| 8,589,335 B2 | 11/2013 | Smith et al. | |
| 8,594,730 B2 | 11/2013 | Bona et al. | |
| 8,615,468 B2 | 12/2013 | Varadarajan | |
| 8,620,218 B2 | 12/2013 | Awad | |
| 8,667,285 B2 | 3/2014 | Coulier et al. | |
| 8,723,941 B1 | 5/2014 | Shirbabadi et al. | |
| 8,726,405 B1 | 5/2014 | Bailey et al. | |
| 8,740,073 B2 | 6/2014 | Vijayshankar et al. | |
| 8,750,514 B2 | 6/2014 | Gallo et al. | |
| 8,752,189 B2 | 6/2014 | de Jong | |
| 8,794,509 B2 | 8/2014 | Bishop et al. | |
| 8,799,668 B2 | 8/2014 | Cheng | |
| 8,806,592 B2 | 8/2014 | Ganesan | |
| 8,807,440 B1 | 8/2014 | von Behren et al. | |
| 8,811,892 B2 | 8/2014 | Khan et al. | |
| 8,814,039 B2 | 8/2014 | Bishop et al. | |
| 8,814,052 B2 | 8/2014 | Bona et al. | |
| 8,818,867 B2 | 8/2014 | Baldwin et al. | |
| 8,850,538 B1 | 9/2014 | Vernon et al. | |
| 8,861,733 B2 | 10/2014 | Benteo et al. | |
| 8,870,081 B2 | 10/2014 | Olson | |
| 8,880,027 B1 | 11/2014 | Darringer | |
| 8,888,002 B2 | 11/2014 | Marshall Chesney et al. | |
| 8,898,088 B2 | 11/2014 | Springer et al. | |
| 8,934,837 B2 | 1/2015 | Zhu et al. | |
| 8,977,569 B2 | 3/2015 | Rao | |
| 8,994,498 B2 | 3/2015 | Agrafioti et al. | |
| 9,004,365 B2 | 4/2015 | Bona et al. | |
| 9,038,893 B2 | 5/2015 | Kirkham | |
| 9,038,894 B2 | 5/2015 | Khalid | |
| 9,042,814 B2 | 5/2015 | Royston et al. | |
| 9,047,531 B2 | 6/2015 | Showering et al. | |
| 9,069,976 B2 | 6/2015 | Toole et al. | |
| 9,081,948 B2 | 7/2015 | Magne | |
| 9,104,853 B2 | 8/2015 | Venkataramani et al. | |
| 9,118,663 B1 | 8/2015 | Bailey et al. | |
| 9,122,964 B2 | 9/2015 | Krawczewicz | |
| 9,129,199 B2 | 9/2015 | Spodak | |
| 9,129,280 B2 | 9/2015 | Bona et al. | |
| 9,152,832 B2 | 10/2015 | Royston et al. | |
| 9,183,490 B2 | 11/2015 | Moreton | |
| 9,203,800 B2 | 12/2015 | Izu et al. | |
| 9,209,867 B2 | 12/2015 | Royston | |
| 9,251,330 B2 | 2/2016 | Boivie et al. | |
| 9,251,518 B2 | 2/2016 | Levin et al. | |
| 9,258,715 B2 | 2/2016 | Borghei | |
| 9,270,337 B2 | 2/2016 | Zhu et al. | |
| 9,275,325 B2 | 3/2016 | Newcombe | |
| 9,286,606 B2 | 3/2016 | Diamond | |
| 9,306,626 B2 | 4/2016 | Hall et al. | |
| 9,306,753 B1 | 4/2016 | Vandervort | |
| 9,306,942 B1 | 4/2016 | Bailey et al. | |
| 9,324,066 B2 | 4/2016 | Archer et al. | |
| 9,324,067 B2 | 4/2016 | Van Os et al. | |
| 9,332,587 B2 | 5/2016 | Salahshoor | |
| 9,338,622 B2 | 5/2016 | Bjontegard | |
| 9,373,141 B1 | 6/2016 | Shakkarwar | |
| 9,379,841 B2 | 6/2016 | Fine et al. | |
| 9,413,430 B2 | 8/2016 | Royston et al. | |
| 9,413,768 B1 | 8/2016 | Gregg et al. | |
| 9,420,496 B1 | 8/2016 | Indurkar | |
| 9,426,132 B1 | 8/2016 | Alikhani | |
| 9,432,339 B1 | 8/2016 | Bowness | |
| 9,455,968 B1 | 9/2016 | Machani et al. | |
| 9,473,509 B2 | 10/2016 | Arsanjani et al. | |
| 9,491,626 B2 | 11/2016 | Sharma et al. | |
| 9,501,776 B2 | 11/2016 | Martin | |
| 9,553,637 B2 | 1/2017 | Yang et al. | |
| 9,619,952 B1 | 4/2017 | Zhao et al. | |
| 9,635,000 B1 | 4/2017 | Muftic | |
| 9,665,858 B1 | 5/2017 | Kumar | |
| 9,674,705 B2 | 6/2017 | Rose et al. | |
| 9,679,286 B2 | 6/2017 | Colnot et al. | |
| 9,680,942 B2 | 6/2017 | Dimmick | |
| 9,710,744 B2 | 7/2017 | Wurmfeld | |
| 9,710,804 B2 | 7/2017 | Zhou et al. | |
| 9,740,342 B2 | 8/2017 | Paulsen et al. | |
| 9,740,988 B1 | 8/2017 | Levin et al. | |
| 9,763,097 B2 | 9/2017 | Robinson et al. | |
| 9,767,329 B2 | 9/2017 | Forster | |
| 9,769,662 B1 | 9/2017 | Queru | |
| 9,773,151 B2 | 9/2017 | Mil'shtein et al. | |
| 9,780,953 B2 | 10/2017 | Gaddam et al. | |
| 9,891,823 B2 | 2/2018 | Feng et al. | |
| 9,940,571 B1 | 4/2018 | Herrington | |
| 9,949,065 B1 | 4/2018 | Zarakas | |
| 9,953,323 B2 | 4/2018 | Candelore et al. | |
| 9,961,194 B1 | 5/2018 | Wiechman et al. | |
| 9,965,632 B2 | 5/2018 | Zarakas | |
| 9,965,756 B2 | 5/2018 | Davis et al. | |
| 9,965,911 B2 | 5/2018 | Wishne | |
| 9,977,890 B2 | 5/2018 | Alberti | |
| 9,978,056 B2 | 5/2018 | Seo | |
| 9,978,058 B2 | 5/2018 | Wurmfeld et al. | |
| 9,990,795 B2 | 6/2018 | Wurmfeld | |
| 10,007,873 B2 | 6/2018 | Heo | |
| 10,013,693 B2 | 7/2018 | Wyatt | |
| 10,043,164 B2 | 8/2018 | Dogin et al. | |
| 10,075,437 B1 | 9/2018 | Costigan et al. | |
| 10,121,130 B2 | 11/2018 | Pinski | |
| 10,129,648 B1 | 11/2018 | Hernandez et al. | |
| 10,133,979 B1 | 11/2018 | Eidam et al. | |
| 10,210,505 B2 | 2/2019 | Zarakas | |
| 10,217,105 B1 | 2/2019 | Sangi et al. | |
| 10,242,368 B1 | 3/2019 | Poole | |
| 10,296,910 B1 | 5/2019 | Templeton | |
| 10,332,102 B2 | 6/2019 | Zarakas | |
| 10,360,557 B2 | 7/2019 | Locke | |
| 10,380,471 B2 | 8/2019 | Locke | |
| 10,395,244 B1 | 8/2019 | Mossler | |
| 10,453,054 B2 | 10/2019 | Zarakas | |
| 10,474,941 B2 | 11/2019 | Wurmfeld | |
| 10,475,027 B2 | 11/2019 | Guise | |
| 10,482,453 B2 | 11/2019 | Zarakas | |
| 10,482,457 B2 | 11/2019 | Poole | |
| 10,489,774 B2 | 11/2019 | Zarakas | |
| 10,489,781 B1 | 11/2019 | Osborn | |
| 10,510,070 B2 | 12/2019 | Wurmfeld | |
| 10,515,361 B2 | 12/2019 | Zarakas | |
| 10,535,068 B2 | 1/2020 | Locke | |
| 10,546,444 B2 | 1/2020 | Osborn | |
| 10,581,611 B1 | 3/2020 | Osborn | |
| 10,664,830 B1 | 5/2020 | Rule | |
| 10,685,349 B2 | 6/2020 | Brickell | |
| 10,797,882 B2 | 10/2020 | Rule | |
| 10,880,741 B2 | 12/2020 | Zarakas | |
| 10,909,525 B1 | 2/2021 | Dhodapkar | |
| 10,909,544 B1 * | 2/2021 | Osborn | G06Q 20/3278 |
| 10,970,691 B2 | 4/2021 | Koeppel | |
| 10,984,416 B2 | 4/2021 | Ilincic | |
| 11,037,136 B2 | 6/2021 | Rule | |
| 11,062,098 B1 | 7/2021 | Bergeron | |
| 11,120,453 B2 | 9/2021 | Rule | |
| 11,138,593 B1 | 10/2021 | Ho | |
| 11,138,605 B2 | 10/2021 | Aabye | |
| 11,176,540 B2 | 11/2021 | Gupta | |
| 11,188,908 B2 | 11/2021 | Locke | |
| 11,216,806 B2 | 1/2022 | Mossler | |
| 11,297,958 B2 | 4/2022 | Vukich | |
| 11,334,872 B2 | 5/2022 | Phillips | |
| 11,361,173 B2 | 6/2022 | Edwards | |
| 11,392,933 B2 | 7/2022 | Mossler | |
| 11,392,935 B2 | 7/2022 | Suresh | |
| 11,416,844 B1 | 8/2022 | Osterkamp | |
| 11,423,392 B1 | 8/2022 | Ho | |

(56) References Cited

U.S. PATENT DOCUMENTS

| | | |
|---|---|---|
| 11,443,292 B2 | 9/2022 | Sherif |
| 11,444,770 B2 | 9/2022 | Wieker |
| 11,461,764 B2 | 10/2022 | Rule |
| 11,481,764 B2 | 10/2022 | Shakkarwar |
| 11,521,213 B2 | 12/2022 | Rule |
| 11,551,200 B1 | 1/2023 | Cook |
| 11,556,918 B2 | 1/2023 | Mestre |
| 11,615,395 B2 | 3/2023 | McHUGH |
| 11,777,933 B2 | 10/2023 | Moreton |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2003/0220876 A1 | 11/2003 | Burger |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0228997 A1 | 10/2005 | Bicker |
| 2005/0247797 A1 | 11/2005 | Ramachandran |
| 2005/0269402 A1 | 12/2005 | Spitzer |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0276765 A1 | 11/2007 | Hazel |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0082452 A1 | 4/2008 | Wankmueller |
| 2008/0086767 A1 | 4/2008 | Kulkarni et al. |
| 2008/0099552 A1 | 5/2008 | Grillion |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0155801 A1 | 6/2011 | Rowberry |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143703 A1 | 6/2012 | Wall |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |

(56)                References Cited

U.S. PATENT DOCUMENTS

| | | |
|---|---|---|
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0030997 A1 | 1/2013 | Spodak |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0146657 A1 | 6/2013 | Graef |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0211937 A1 | 8/2013 | Elbirt |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0311363 A1 | 11/2013 | Ramaci |
| 2013/0312082 A1 | 11/2013 | Zu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0081785 A1 | 3/2014 | Valadas Preto |
| 2014/0100986 A1 | 4/2014 | Linden et al. |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365377 A1 | 12/2014 | Salama |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0073983 A1 | 3/2015 | Bartenstein |
| 2015/0088757 A1 | 3/2015 | Zhou et al. |
| 2015/0089586 A1 | 3/2015 | Ballesteros |
| 2015/0113271 A1 | 4/2015 | Jooste |
| 2015/0134452 A1 | 5/2015 | Williams |
| 2015/0134513 A1 | 5/2015 | Olson |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0199673 A1 | 7/2015 | Savolainen |
| 2015/0199863 A1 | 7/2015 | Scoggins |
| 2015/0205379 A1 | 7/2015 | Mag et al. |
| 2015/0254637 A1 | 9/2015 | Yang |
| 2015/0302409 A1 | 10/2015 | Malek et al. |
| 2015/0317295 A1 | 11/2015 | Sherry |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0078430 A1 | 3/2016 | Douglas |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0189143 A1 | 6/2016 | Koeppel |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307186 A1 | 10/2016 | Noë et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |

(56) References Cited

U.S. PATENT DOCUMENTS

| | | |
|---|---|---|
| 2018/0039986 A1 | 2/2018 | Essebag et al. |
| 2018/0039987 A1 | 2/2018 | Molino |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0172055 A1 | 6/2019 | Hale |
| 2019/0238517 A1 | 8/2019 | D'Agostino et al. |
| 2019/0303945 A1 | 10/2019 | Mitra |
| 2020/0043027 A1 | 2/2020 | Bhasin |
| 2020/0106616 A1* | 4/2020 | Rule ..................... G06F 21/35 |
| 2021/0004806 A1 | 1/2021 | Noe |
| 2021/0182892 A1* | 6/2021 | Henderson ......... G06Q 30/0222 |
| 2021/0272098 A1 | 9/2021 | Delsuc |
| 2021/0304189 A1 | 9/2021 | Gupta |
| 2021/0365976 A1 | 11/2021 | Johnson et al. |
| 2021/0383360 A1 | 12/2021 | Sinha |
| 2021/0406869 A1 | 12/2021 | Pathrabe |
| 2022/0114581 A1 | 4/2022 | Upadhye |
| 2022/0207553 A1 | 6/2022 | Hudson et al. |
| 2022/0284416 A1 | 9/2022 | Rule |
| 2022/0309509 A1 | 9/2022 | Akgun |
| 2022/0335412 A1 | 10/2022 | Rule |
| 2022/0335432 A1* | 10/2022 | Rule ................... G06Q 20/382 |
| 2022/0366410 A1 | 11/2022 | Rule |
| 2022/0398566 A1 | 12/2022 | Rule |
| 2022/0414648 A1 | 12/2022 | Rule |
| 2023/0054157 A1 | 2/2023 | Mao |
| 2023/0065163 A1 | 3/2023 | Vargas |
| 2023/0083785 A1 | 3/2023 | Maiman |
| 2023/0169505 A1 | 6/2023 | Rule |
| 2023/0354020 A1 | 11/2023 | Rule |
| 2023/0359839 A1 | 11/2023 | Lovgren |

FOREIGN PATENT DOCUMENTS

| | | | |
|---|---|---|---|
| CN | 103023643 A | | 4/2013 |
| CN | 103417202 A | | 12/2013 |
| EP | 1085424 A1 | | 3/2001 |
| EP | 1223565 A1 | | 7/2002 |
| EP | 1265186 A2 | | 12/2002 |
| EP | 1783919 A1 | | 5/2007 |
| EP | 2139196 A1 | | 12/2009 |
| EP | 1469419 A1 | | 8/2012 |
| EP | 2852070 A1 | | 3/2015 |
| GB | 2457221 A | | 8/2009 |
| GB | 2516861 A | | 2/2015 |
| GB | 2551907 A | | 1/2018 |
| KR | 101508320 B1 | | 4/2015 |
| KR | 20150140132 A | | 12/2015 |
| WO | 9910824 A1 | | 3/1999 |
| WO | 0049586 A1 | | 8/2000 |
| WO | 2006070189 A2 | | 7/2006 |
| WO | 2008055170 A2 | | 5/2008 |
| WO | 2009025605 A2 | | 2/2009 |
| WO | 2010049252 A1 | | 5/2010 |
| WO | 2011112158 A1 | | 9/2011 |
| WO | 2012001624 A1 | | 1/2012 |
| WO | 2013039395 A1 | | 3/2013 |
| WO | 2013155562 A1 | | 10/2013 |
| WO | 2013192358 A2 | | 12/2013 |
| WO | 2014043278 A1 | | 3/2014 |
| WO | 2014170741 A2 | | 10/2014 |
| WO | 2015179649 A1 | | 11/2015 |
| WO | 2015183818 A1 | | 12/2015 |
| WO | 2016097718 A1 | | 6/2016 |
| WO | 2016160816 A1 | | 10/2016 |
| WO | 2016168394 A1 | | 10/2016 |
| WO | 2017042375 A1 | | 3/2017 |
| WO | 2017042400 A1 | | 3/2017 |
| WO | 2017047855 A1 | | 3/2017 |
| WO | 2017157859 A1 | | 9/2017 |
| WO | 2017208063 A1 | | 12/2017 |
| WO | 2018063809 A1 | | 4/2018 |
| WO | 2018137888 A1 | | 8/2018 |
| WO | 2019022585 A1 | | 1/2019 |
| WO | 2021051884 A1 | | 3/2021 |
| WO | 2021133492 A1 | | 7/2021 |
| WO | 2022108959 A1 | | 5/2022 |
| WO | 2022187350 A1 | | 9/2022 |
| WO | 2023017943 A1 | | 2/2023 |
| WO | 2023064063 A1 | | 4/2023 |

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag", StackExchange [online] 2013 [retrieved on Mar. 25, 2019]. Retrieved

(56)                     References Cited

OTHER PUBLICATIONS from the Internet URL: https://android.stackexchange.com/questions/ 55689/how-to-copy-text-string-from-nfc-tag, 11 pages.

Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/ aggregateMAC.pdf, 11 pages.

Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/ projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple. wikipedia.org/wiki/Triple_DES, 2 pages.

Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/ 509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/ cs6903/Lectures/lecture10.pdf, 8 pages.

Berg, G., "Fundamentals of EMV", Smart Card Alliance [online] date unknown [retrieved on Mar. 27, 2019]. Retrieveed from Internet URL: https://www.securetechalliance.org/resources/media/ scap13_preconference/02.pdf, 37 pages.

Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/ Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www. computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893? co=GENIE.Platform%3DDesktop&hl=en, 3 pages.

Author Unknown, "Autofill credit cards, contacts, and passwords in Safari on Mac", Apple Safari User Guide [online] 2019 [retrieved on Mar. 25, 2019]. Retrieved from Internet URL: https://support. apple.com/guide/safari/use-autofill-ibrw1103/mac, 3 pages.

Menghin, M.J., "Power Optimization Techniques for Near Field Communication Systems", 2014 Dissertation at Technical University of Graz [online]. Retrieved from Internet URL: https://diglib. tugraz.at/download.php?id=576a7b910d2d6&location=browse, 135 pages.

Mareli, M., et al., "Experimental evaluation of NFC reliability between an RFID tag and a smartphone", Conference paper (2013) IEEE AFRICON At Mauritius [online] [retrieved on Mar. 25, 2019]. Retrieved from Internet URL: https://core.ac.uk/download/pdf/ 54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/ banking/banking-app-location-sharing/, 6 pages.

Author Unknown: "onetappayment™", [online] Jan. 24, 2019, [retrieved on Mar. 25, 2019]. Retrieved from Internet URL: https:// www.payubiz.in/onetap, 4 pages.

Vu, et al., "Distinguishing users with capacitive touch communication", Proceedings of the Annual International Conference on Mobile Computing and Networking, 2012, MOBICOM. 10.1145/ 2348543.2348569.

Pourghomi, P., et al., "A Proposed NFC Payment Application," International Journal of Advanced Computer Science and Applications, 4(8):173-181 (2013).

Author unknown, "EMV Card Personalization Specification", EMVCo., LLC., specification version 1.0, (2003) 81 pages.

Ullmann et al., "On-Card" User Authentication for Contactless Smart Cards based on Gesture Recognition, paper presentation LNI proceedings, (2012) 12 pages.

Faraj, S.T., et al., "Investigation of Java Smart Card Technology for Multi-Task Applications", J of Al-Anbar University for Pure Science, 2(1):23 pages (2008).

Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https:// www.annexcloude.com/blog/benefits-unified-platform/, 13 pages.

Author Unknown, "Global expansion of card tapping mobile OTP for security and convenience is imminent," Jun. 28, 2022, website: https://www.swidch.com/blogs/card-tapping-motp-blog.

EMVCo, LLC, "EMV Card Personalisation Specification," Aug. 1, 2021, retrieved from the Internet URL: https://www.emvco.com/ specification/?post_id=12467, 114 pages.

Saush, "Getting information from an EMV chip card with Java," Sep. 8, 2006, WordPress, pp. 1-13.

Smart Card Alliance, "Co-Branded Multi-Application Contactless Cards for Transit and Financial Payment," A Smart Card Alliance Transportation Council White Paper (40 pages), Mar. 2008.

* cited by examiner

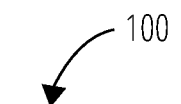
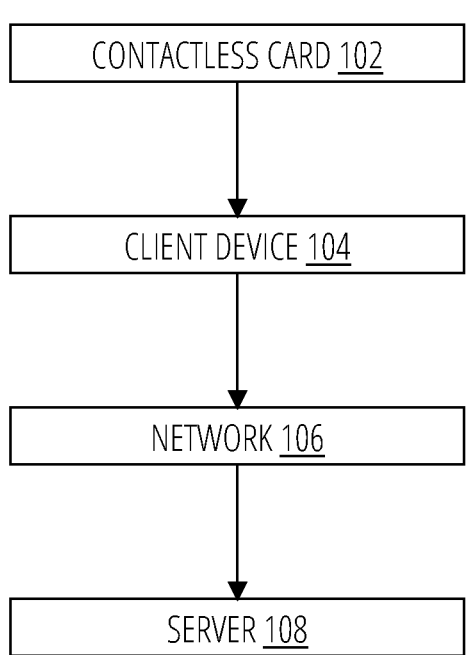
FIG. 1

200

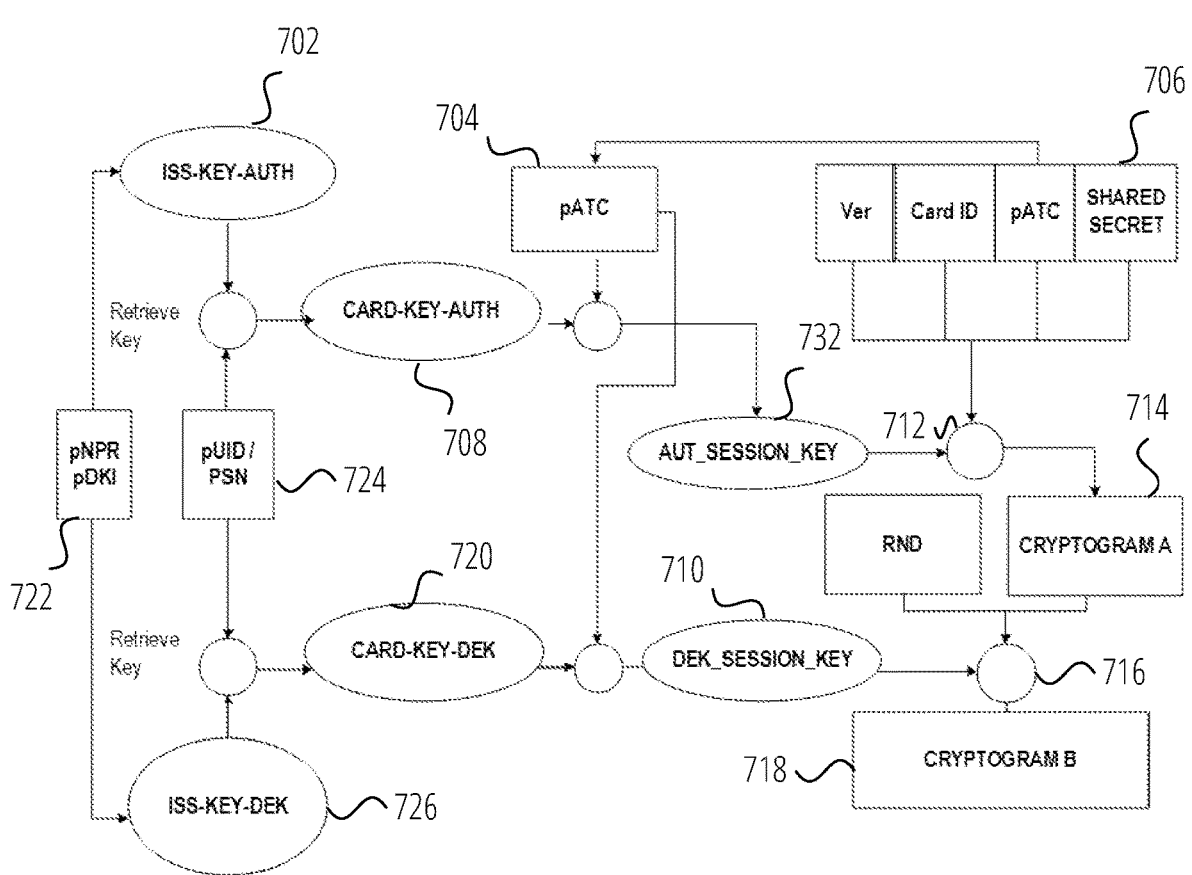
FIG. 7

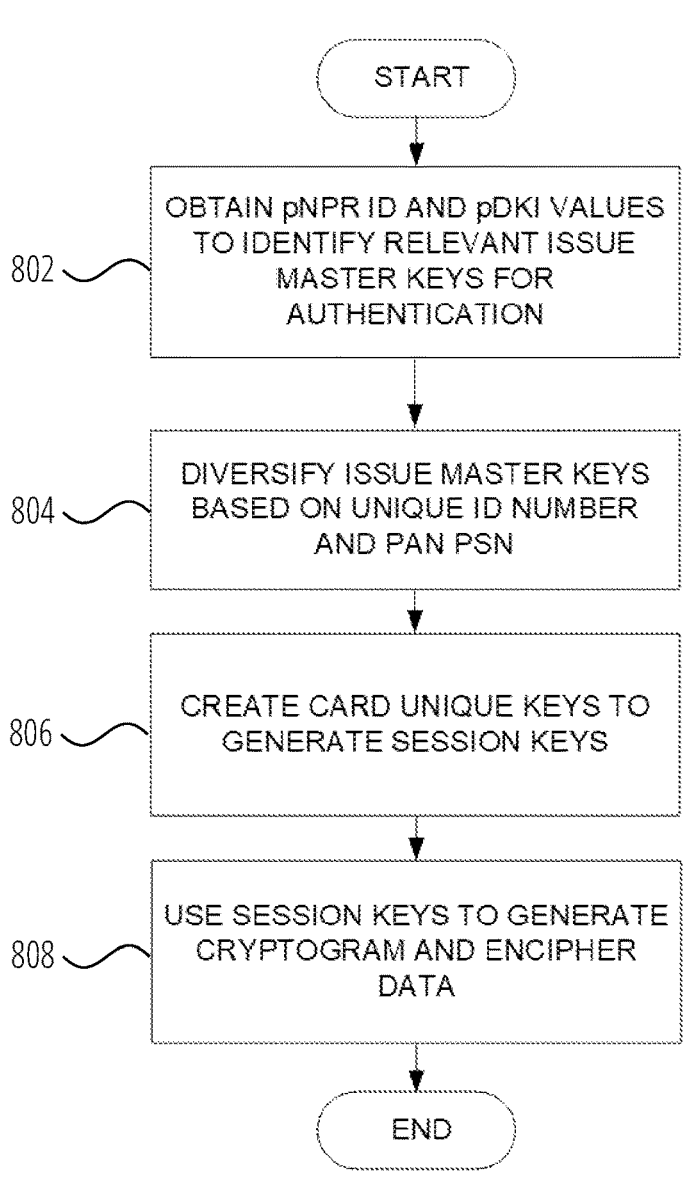
FIG. 8

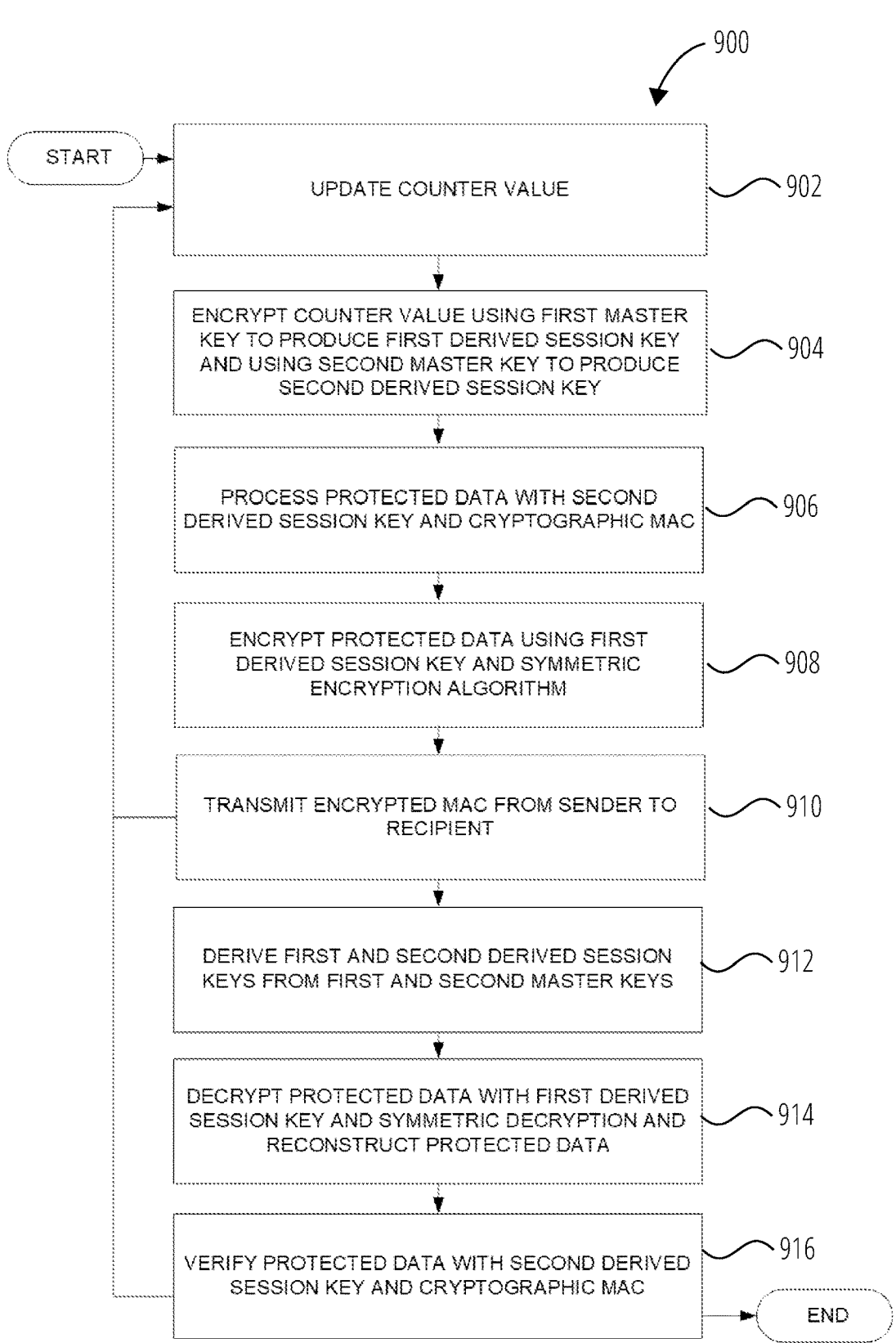

900

START

UPDATE COUNTER VALUE — 902

ENCRYPT COUNTER VALUE USING FIRST MASTER KEY TO PRODUCE FIRST DERIVED SESSION KEY AND USING SECOND MASTER KEY TO PRODUCE SECOND DERIVED SESSION KEY — 904

PROCESS PROTECTED DATA WITH SECOND DERIVED SESSION KEY AND CRYPTOGRAPHIC MAC — 906

ENCRYPT PROTECTED DATA USING FIRST DERIVED SESSION KEY AND SYMMETRIC ENCRYPTION ALGORITHM — 908

TRANSMIT ENCRYPTED MAC FROM SENDER TO RECIPIENT — 910

DERIVE FIRST AND SECOND DERIVED SESSION KEYS FROM FIRST AND SECOND MASTER KEYS — 912

DECRYPT PROTECTED DATA WITH FIRST DERIVED SESSION KEY AND SYMMETRIC DECRYPTION AND RECONSTRUCT PROTECTED DATA — 914

VERIFY PROTECTED DATA WITH SECOND DERIVED SESSION KEY AND CRYPTOGRAPHIC MAC — 916

END

FIG. 9

1200
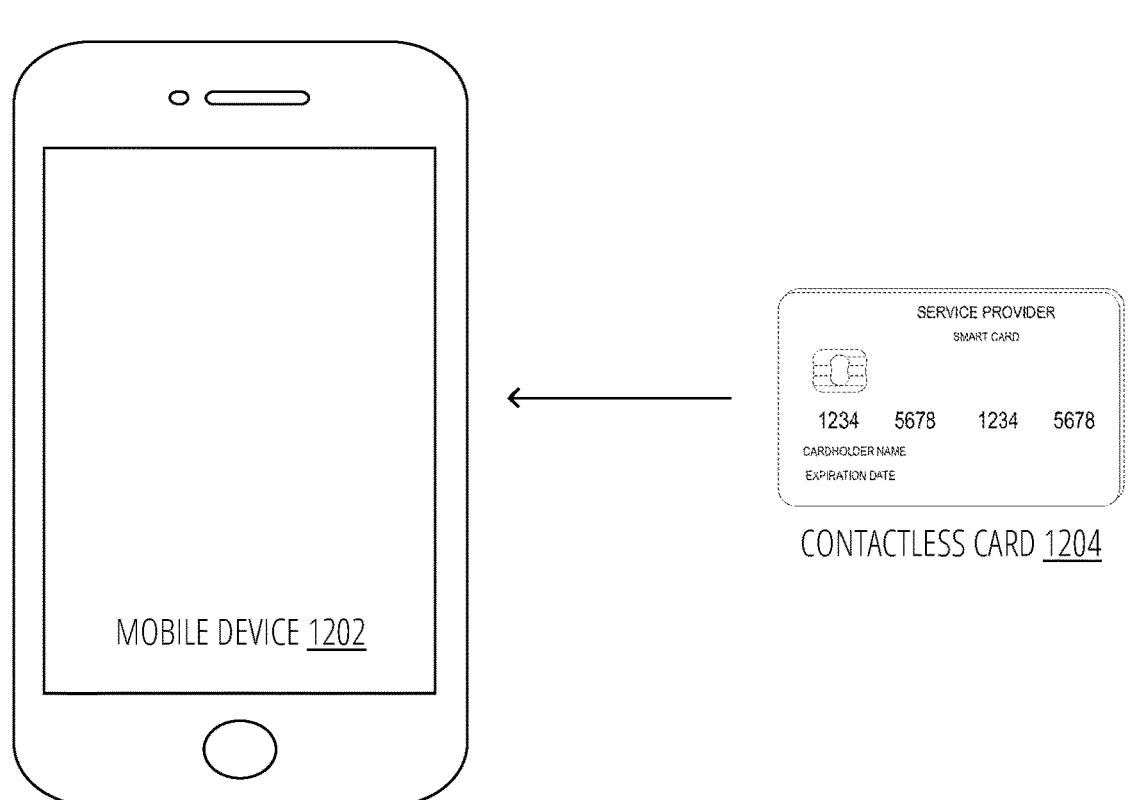
SERVICE PROVIDER
SMART CARD
1234    5678    1234    5678
CARDHOLDER NAME
EXPIRATION DATE
CONTACTLESS CARD <u>1204</u>
MOBILE DEVICE <u>1202</u>
FIG. 12

RECEIVING A CRYPTOGRAM FROM A CONTACTLESS CARD 1302

VERIFYING THE CRYPTOGRAM 1304

WHEN THE CRYPTOGRAM HAS BEEN VERIFIED AND A FIRST MOBILE APPLICATION IS RUNNING ON A MOBILE DEVICE, LAUNCHING A SECOND MOBILE APPLICATION OR A SHOPPING BROWSER EXTENSION ON THE MOBILE DEVICE 1306

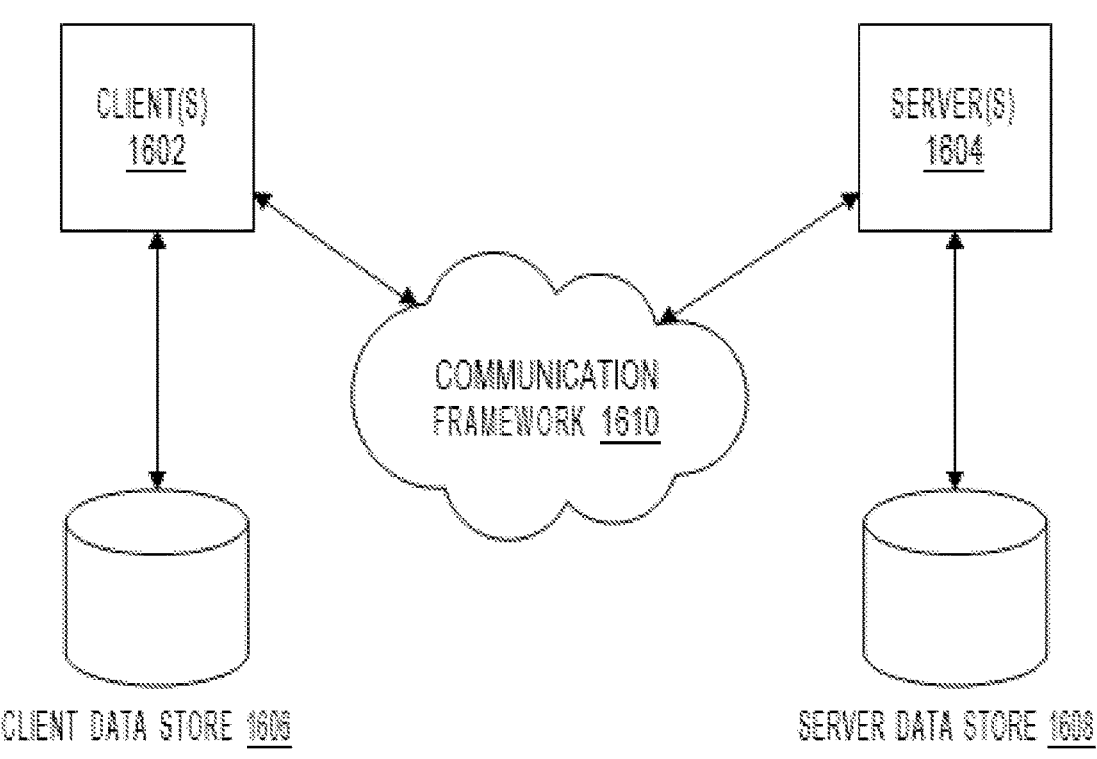
FIG. 16

SYSTEMS AND METHODS FOR LAUNCHING A MOBILE APPLICATION OR A BROWSER EXTENSION RESPONSIVE TO SATISFYING PREDETERMINED CONDITIONS

BACKGROUND

Browser extensions that add functionalities to or enhance functionalities of websites are known in the art. For example, a shopping browser extension, such as Capital One Shopping, can enhance an online shopping experience for a user by automatically applying available coupons to any items in a cart of a visited website at checkout and/or automatically searching for a better price for any items in the cart of the visited website at checkout, displaying the better price found at an alternative website in a popup window. In operation, the shopping browser extension can run in the background to search a plurality of websites for the available coupons and/or the better price.

Currently, known shopping browser extensions are only available via a web browser on a desktop, thereby preventing users that are shopping and purchasing via mobile applications from any benefits of shopping browser extensions.

BRIEF SUMMARY

In some embodiments, a method can include receiving, by a short-range communication antenna of a mobile device, a cryptogram from a contactless card, verifying, by a processor of the mobile device, the cryptogram, and when the cryptogram has been verified and a first mobile application is running on the mobile device, launching a second mobile application or a shopping browser extension on the mobile device.

In some embodiments, responsive to the first mobile application running on the mobile device, the method can include displaying, on a display screen of the mobile device, a solicitation for communication with the contactless card. For example, in some embodiments, responsive to displaying, on the display screen of the mobile device, a payment screen associated with the first mobile application, the method can include displaying, on the display screen of the mobile device, the solicitation for the communication with the contactless card. Additionally or alternatively, in some embodiments, responsive to an item being placed in a shopping cart associated with the first mobile application, the method can include displaying, on the display screen of the mobile device, the solicitation for the communication with the contactless card.

In some embodiments, the method can include successfully decrypting the cryptogram to verify the cryptogram. For example, in some embodiments, the method can include decrypting protected data in the cryptogram, comparing the protected data to record data associated with the contactless card, and when the protected data matches the record data, verifying a customer associated with the contactless card.

In some embodiments, the method can include transmitting the cryptogram from the mobile device to a server, and receiving, at the mobile device, an indication from the server that the cryptogram is verified.

In some embodiments, the second mobile application or the shopping browser extension can automatically apply available coupons to items in a cart associated with the first mobile application. Additionally or alternatively, in some embodiments, the second mobile application or the shopping browser extension can automatically search for a better price for items in a cart associated with the first mobile application and display, on the display screen of the mobile device, the better price found at an alternative website.

In some embodiments, a non-transitory computer-readable medium can include instructions that, when executed by a processor, cause the processor to receive, via a short-range communication antenna of a mobile device, a cryptogram from a contactless card, verify the cryptogram, and when the cryptogram has been verified and a first mobile application is running on the mobile device, launch a second mobile application or a shopping browser extension on the mobile device.

In some embodiments, responsive to the first mobile application running on the mobile device, the instructions can further cause the processor to display, on a display screen of the mobile device, a solicitation for communication with the contactless card. For example, in some embodiments, responsive to displaying, on the display screen of the mobile device, a payment screen associated with the first mobile application, the instructions can further cause the processor to display, on the display screen of the mobile device, the solicitation for the communication with the contactless card. Additionally or alternatively, in some embodiments, responsive to an item being placed in a shopping cart associated with the first mobile application, the instructions can further cause the processor to display, on the display screen of the mobile device, the solicitation for the communication with the contactless card.

In some embodiments, the instructions can further cause the processor to successfully decrypt the cryptogram to verify the cryptogram. For example, in some embodiments, the instructions can further cause the processor to decrypt protected data in the cryptogram, compare the protected data to record data associated with the contactless card, and when the protected data matches the record data, verify a customer associated with the contactless card.

In some embodiments, the instructions can further cause the processor to transmit the cryptogram from the mobile device to a server, and receive, at the mobile device, an indication from the server that the cryptogram is verified.

In some embodiments, the second mobile application or the shopping browser extension can automatically apply available coupons to items in a cart associated with the first mobile application. Additionally or alternatively, in some embodiments, the second mobile application or the shopping browser extension can automatically search for a better price for items in a cart associated with the first mobile application and display, on a display screen of the mobile device, the better price found at an alternative website.

In some embodiments, a mobile device can include a short-range communication antenna, a processor, and a memory storing instructions that, when executed by the processor, cause the processor to receive, via the short-range communication antenna, a cryptogram from a contactless card, verify the cryptogram, and when the cryptogram has been verified and the processor is running a first mobile application, launch a second mobile application or a shopping browser extension.

In some embodiments, the mobile device can also include a display device, and the instructions can further cause the processor to display, on the display screen, a solicitation for communication with the contactless card responsive to the processor running the first mobile application.

Other technical features may be readily apparent to one skilled in the art from the following figures, descriptions, and claims.

BRIEF DESCRIPTION OF THE SEVERAL VIEWS OF THE DRAWINGS

FIG. 1 illustrates an example of a system in accordance with one embodiment.

FIG. 7 illustrates an example of a key system in accordance with one embodiment.

FIG. 8 illustrates an example of a method of generating a cryptogram in accordance with one embodiment.

FIG. 9 illustrates an example of a method of key diversification in accordance with one embodiment.

FIG. 12 illustrates an example of a system in accordance with one embodiment.

FIG. 16 illustrates an example of a communications architecture in accordance with one embodiment.

DETAILED DESCRIPTION

Figure 2:
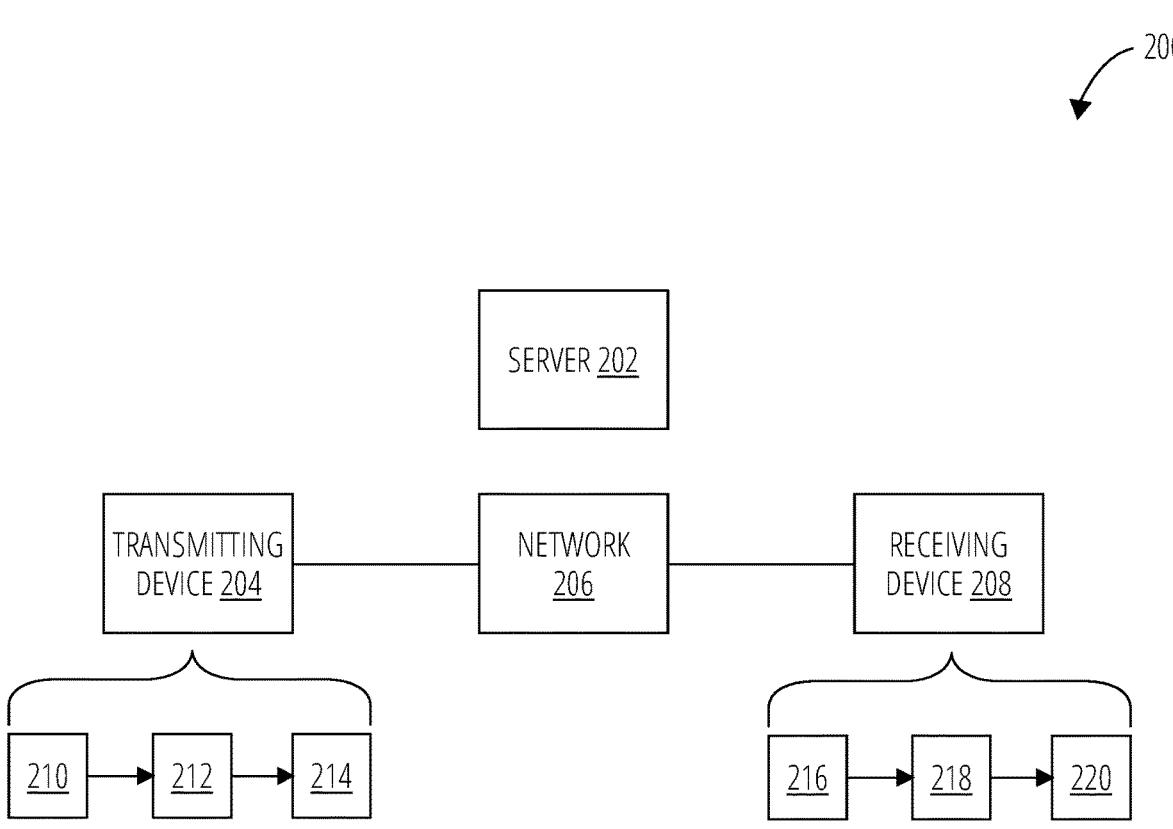
FIG. 2 illustrates an example of a system in accordance with one embodiment.

Embodiments disclosed herein are generally directed to systems and methods for launching a mobile application or a browser extension responsive to satisfying predetermined conditions. For example, a contactless card can be registered with a mobile device. The contactless card can also be registered with a shopping mobile application and/or a shopping browser extension, such as Capital One Shopping. When the mobile device is being used for shopping via a merchant application, the mobile device can receive a cryptogram from the contactless card, verify the cryptogram, and when the cryptogram has been verified, launch the shopping mobile application and/or the shopping browser extension. Launching, in this context, can include opening and running the shopping mobile application and/or the shopping browser extension on the mobile device. The predetermined conditions that can be satisfied can include the merchant application running on the mobile device, the mobile device receiving the cryptogram from the contactless card, the contactless card being registered with the mobile device, the contactless card being registered with the shopping mobile application and/or the shopping browser extension, and the mobile device verifying the cryptogram.

Advantageously, when the shopping mobile application and/or the shopping browser extension is launched, the shopping mobile application and/or the shopping browser extension can add functionalities to and/or enhance functionalities of the merchant application. For example, in some embodiments, the shopping mobile application and/or the shopping browser extension can automatically apply available coupons to any items in a cart associated with the merchant application. Additionally or alternatively, in some embodiments, the shopping mobile application and/or the shopping browser extension can automatically search for a better price for any items in the cart associated with the merchant application and display the better price found at an alternative website to a user of the mobile device.

Additional advantages of embodiments disclosed herein can include opening the shopping mobile application and/or the shopping browser extension without input that requires the user to exit the merchant application. For example, the user can bring the contactless card into a communication range of the mobile device for transmitting the cryptogram thereto without exiting the merchant application. Furthermore, because the shopping mobile application and/or the shopping browser extension can be automatically launched responsive to the cryptogram being verified, the user need not exit the merchant application to select the shopping mobile application and/or the shopping browser extension.

Even further advantages of embodiments disclosed herein can include running the shopping mobile application and/or the shopping browser extension in the background to search a plurality of websites for the available coupons and/or the better price. As such, the user can continue shopping via the merchant application without interruption to find better deals while simultaneously being presented with advantages associated with those better deals.

Still further advantages of embodiments disclosed herein can include ensuring that the shopping mobile application and/or the shopping browser extension are launched only for registered users thereof. For example, because the cryptogram, and therefore, the contactless card and the user associated therewith, must be verified prior to launching the shopping mobile application and/or the shopping browser extension, embodiments disclosed herein can ensure that the contactless card is registered with the shopping mobile application and/or the shopping browser extension prior to launch. In this regard, a contactless card, and therefore, a user thereof, that is not registered with the shopping mobile application and/or the shopping browser extension may not avail itself to any benefits thereof.

Details of the above-identified embodiments and additional advantages thereof are discussed in the following description.

FIG. 1 illustrates a data transmission system 100 according to an example embodiment. As further discussed below, system 100 may include contactless card 102, client device 104, network 106, and server 108. Although FIG. 1 illustrates single instances of the components, system 100 may include any number of components.

System 100 may include one or more contactless cards 102, which are further explained below. In some embodiments, contactless card 102 may be in wireless communication, utilizing Near-Field Communication (NFC) in an example, with client device 104.

System 100 may include client device 104, which may be a network-enabled computer. As referred to herein, a network-enabled computer may include, but is not limited to a computer device, or communications device including, e.g., a server, a network appliance, a personal computer, a workstation, a phone, a handheld personal computer (PC), a personal digital assistant, a thin client, a fat client, an Internet browser, or other device. Client device 104 also may be a mobile device; for example, a mobile device may include an iPhone, iPod, iPad from Apple® or any other mobile device running Apple's iOS® operating system, any device running Microsoft's Windows® mobile operating system, any device running Google's Android® operating system, and/or any other smartphone, tablet, or like wearable mobile device.

The client device 104 device can include a processor and a memory, and it is understood that the processing circuitry may contain additional components, including processors, memories, error and parity/cyclic redundancy check (CRC) checkers, data encoders, anticollision algorithms, controllers, command decoders, security primitives and tamper-proofing hardware, as necessary to perform the functions described herein. The client device 104 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch screen, keyboard, mouse, cursor-control device, touch screen, microphone, digital camera, video recorder or camcorder. These devices may be used to enter information and interact with the software and other devices described herein.

In some examples, client device 104 of system 100 may execute one or more applications, such as software applications, that enable, for example, network communications with one or more components of system 100 and transmit and/or receive data.

The client device 104 may be in communication with one or more server(s) 108 via one or more network(s) 106 and may operate as a respective front-end to back-end pair with server 108. The client device 104 may transmit, for example, from a mobile device application executing on client device 104, one or more requests to server 108. The one or more requests may be associated with retrieving data from server 108. The server 108 may receive the one or more requests from client device 104. Based on the one or more requests from client device 104, server 108 may be configured to retrieve the requested data from one or more databases (not shown). Based on receipt of the requested data from the one or more databases, server 108 may be configured to transmit the received data to client device 104, the received data being responsive to one or more requests.

System 100 may include one or more networks 106. In some examples, network 106 may be one or more of a wireless network, a wired network, or any combination of wireless network and wired network and may be configured to connect client device 104 to server 108. For example, network 106 may include one or more of a fiber optics network, a passive optical network, a cable network, an Internet network, a satellite network, a wireless local area network (LAN), a Global System for Mobile Communication, a Personal Communication Service, a personal area network (PAN), Wireless Application Protocol, Multimedia Messaging Service, Enhanced Messaging Service, Short Message Service, Time Division Multiplexing based systems, Code Division Multiple Access based systems, Digital Advanced Mobile Phone Service (D-AMPS), Wi-Fi (Wireless Fidelity), Fixed Wireless Data, Institute of Electrical and Electronics Engineers (IEEE) 802.11 family of networking, Bluetooth, NFC, Radio Frequency Identification (RFID), and/or the like.

In addition, network 106 may include, without limitation, telephone lines, fiber optics, IEEE Ethernet 802.3, a WAN, a wireless PAN, a LAN, or a global network such as the Internet. In addition, network 106 may support an Internet network, a wireless communication network, a cellular network, or the like, or any combination thereof. Network 106 may further include one network, or any number of the exemplary types of networks mentioned above, operating as a stand-alone network or in cooperation with each other. Network 106 may utilize one or more protocols of one or more network elements to which they are communicatively coupled. Network 106 may translate to or from other protocols to one or more protocols of network devices. Although network 106 is depicted as a single network, it should be appreciated that according to one or more examples, network 106 may comprise a plurality of interconnected networks, such as, for example, the Internet, a service provider's network, a cable television network, corporate networks, such as credit card association networks, and home networks.

System 100 may include one or more servers 108. In some examples, server 108 may include one or more processors, which are coupled to memory. The server 108 may be configured as a central system, server or platform to control and call various data at different times to execute a plurality of workflow actions. Server 108 may be configured to connect to the one or more databases. The server 108 may be connected to at least one client device 104.

FIG. 2 illustrates a data transmission system according to an example embodiment. System 200 may include a transmitter or transmitting device 204 and a receiver or receiving device 208 in communication, for example, via network 206, with one or more servers 202. Transmitter or transmitting device 204 may be the same as, or similar to, client device 104 discussed above with reference to FIG. 1. Receiver or receiving device 208 may be the same as, or similar to, client device 104 discussed above with reference to FIG. 1. Network 206 may be similar to network 106 discussed above with reference to FIG. 1. Server 202 may be similar to server 108 discussed above with reference to FIG. 1. Although FIG. 2 shows single instances of components of system 200, system 200 may include any number of the illustrated components.

When using symmetric cryptographic algorithms, such as encryption algorithms, hash-based message authentication code (HMAC) algorithms, and cipher-based message authentication code (CMAC) algorithms, it is important that the key remain secret between the party that originally processes the data that is protected using a symmetric algorithm and the key, and the party who receives and processes the data using the same cryptographic algorithm and the same key.

It is also important that the same key is not used too many times. If a key is used or reused too frequently, that key may be compromised. Each time the key is used, it provides an attacker an additional sample of data which was processed by the cryptographic algorithm using the same key. The more data which the attacker has which was processed with the same key, the greater the likelihood that the attacker may discover the value of the key. A key used frequently may be comprised in a variety of different attacks.

Moreover, each time a symmetric cryptographic algorithm is executed, it may reveal information, such as side-channel data, about the key used during the symmetric cryptographic operation. Side-channel data may include minute power fluctuations which occur as the cryptographic algorithm executes while using the key. Sufficient measurements may be taken of the side-channel data to reveal enough information about the key to allow it to be recovered by the attacker. Using the same key for exchanging data would repeatedly reveal data processed by the same key.

However, by limiting the number of times a particular key will be used, the amount of side-channel data which the attacker is able to gather is limited and thereby reduces exposure to this and other types of attack. As further described herein, the parties involved in the exchange of cryptographic information (e.g., sender and recipient) can independently generate keys from an initial shared master symmetric key in combination with a counter value, and thereby periodically replace the shared symmetric key being used without needing to resort to any form of key exchange to keep the parties in sync. By periodically changing the shared secret symmetric key used by the sender and the recipient, the attacks described above are rendered impossible.

Referring back to FIG. 2, system 200 may be configured to implement key diversification. For example, a sender and recipient may desire to exchange data (e.g., original sensitive data) via respective devices 204 and 208. As explained above, although single instances of transmitting device 204 and receiving device 208 may be included, it is understood that one or more transmitting devices 204 and one or more receiving devices 208 may be involved so long as each party shares the same shared secret symmetric key. In some examples, transmitting device 204 and receiving device 208 may be provisioned with the same master symmetric key. Further, it is understood that any party or device holding the same secret symmetric key may perform the functions of the transmitting device 204 and similarly any party holding the same secret symmetric key may perform the functions of the receiving device 208. In some examples, the symmetric key may comprise the shared secret symmetric key which is kept secret from all parties other than the transmitting device 204 and the receiving device 208 involved in exchanging the secure data. It is further understood that both the transmitting device 204 and the receiving device 208 may be provided with the same master symmetric key, and further that part of the data exchanged between the transmitting device 204 and the receiving device 208 comprises at least a portion of data which may be referred to as the counter value. The counter value may comprise a number that changes each time data is exchanged between the transmitting device 204 and the receiving device 208.

System 200 may include one or more networks 206. In some examples, network 206 may be one or more of a wireless network, a wired network, or any combination of wireless network and wired network and may be configured to connect one or more transmitting devices 204 and one or more receiving devices 208 to server 202. For example, network 206 may include one or more of a fiber optics network, a passive optical network, a cable network, an Internet network, a satellite network, a wireless LAN, a Global System for Mobile Communication, a Personal Communication Service, a PAN, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11 family network, Bluetooth, NFC, RFID, and/or the like.

In addition, network 206 may include, without limitation, telephone lines, fiber optics, IEEE Ethernet 902.3, a WAN, a wireless PAN, a LAN, or a global network such as the Internet. In addition, network 206 may support an Internet network, a wireless communication network, a cellular network, or the like, or any combination thereof. Network 206 may further include one network, or any number of the exemplary types of networks mentioned above, operating as a stand-alone network or in cooperation with each other.

Network 206 may utilize one or more protocols of one or more network elements to which they are communicatively coupled. Network 206 may translate to or from other protocols to one or more protocols of network devices. Although network 206 is depicted as a single network, it should be appreciated that according to one or more examples, network 206 may comprise a plurality of interconnected networks, such as, for example, the Internet, a service provider's network, a cable television network, corporate networks, such as credit card association networks, and home networks.

In some examples, one or more transmitting devices 204 and one or more receiving devices 208 may be configured to communicate and transmit and receive data between each other without passing through network 206. For example, communication between the one or more transmitting devices 204 and the one or more receiving devices 208 may occur via at least one of NFC, Bluetooth, RFID, Wi-Fi, and/or the like.

At block 210, when the transmitting device 204 is preparing to process the sensitive data with symmetric cryptographic operation, the sender may update a counter. In addition, the transmitting device 204 may select an appropriate symmetric cryptographic algorithm, which may include at least one of a symmetric encryption algorithm, HMAC algorithm, and a CMAC algorithm. In some examples, the symmetric algorithm used to process the diversification value may comprise any symmetric cryptographic algorithm used as needed to generate the desired length diversified symmetric key. Non-limiting examples of the symmetric algorithm may include a symmetric encryption algorithm such as Triple Data Encryption Stand (3DES) or Advanced Encryption Standard 128 (AES128); a symmetric HMAC algorithm, such as HMAC-SHA-256; and a symmetric CMAC algorithm such as AES-CMAC. It is understood that if the output of the selected symmetric algorithm does not generate a sufficiently long key, techniques such as processing multiple iterations of the symmetric algorithm with different input data and the same master key may produce multiple outputs which may be combined as needed to produce sufficient length keys.

At block 212, the transmitting device 204 may take the selected cryptographic algorithm, and using the master symmetric key, process the counter value. For example, the sender may select a symmetric encryption algorithm, and use a counter which updates with every conversation between the transmitting device 204 and the receiving device 208. The transmitting device 204 may then encrypt the counter value with the selected symmetric encryption algorithm using the master symmetric key, creating a diversified symmetric key.

In some examples, the counter value may not be encrypted. In these examples, the counter value may be transmitted between the transmitting device 204 and the receiving device 208 at block 212 without encryption.

At block 214, the diversified symmetric key may be used to process the sensitive data before transmitting the result to the receiving device 208. For example, the transmitting device 204 may encrypt the sensitive data using a symmetric encryption algorithm using the diversified symmetric key, with the output comprising the protected encrypted data. The transmitting device 204 may then transmit the protected encrypted data, along with the counter value, to the receiving device 208 for processing.

At block 216, the receiving device 208 may first take the counter value and then perform the same symmetric encryption using the counter value as input to the encryption, and the master symmetric key as the key for the encryption. The output of the encryption may be the same diversified symmetric key value that was created by the sender.

At block 218, the receiving device 208 may then take the protected encrypted data and, using a symmetric decryption algorithm along with the diversified symmetric key, decrypt the protected encrypted data.

At block 220, as a result of decrypting the protected encrypted data, the original sensitive data may be revealed.

The next time sensitive data needs to be sent from the sender to the recipient via respective transmitting device 204 and receiving device 208, a different counter value may be selected producing a different diversified symmetric key. By processing the counter value with the master symmetric key and same symmetric cryptographic algorithm, both the transmitting device 204 and the receiving device 208 may independently produce the same diversified symmetric key. This diversified symmetric key, not the master symmetric key, is used to protect the sensitive data.

As explained above, both the transmitting device 204 and the receiving device 208 each initially possess the shared master symmetric key. The shared master symmetric key is not used to encrypt the original sensitive data. Because the diversified symmetric key is independently created by both the transmitting device 204 and the receiving device 208, it is never transmitted between the two parties. Thus, an attacker cannot intercept the diversified symmetric key and the attacker never sees any data which was processed with the master symmetric key. Only the counter value is processed with the master symmetric key, not the sensitive data. As a result, reduced side-channel data about the master symmetric key is revealed. Moreover, the operation of the transmitting device 204 and the receiving device 208 may be governed by symmetric requirements for how often to create a new diversification value, and, therefore, a new diversified symmetric key. In an embodiment, a new diversification value and, therefore, a new diversified symmetric key may be created for every exchange between the transmitting device 204 and the receiving device 208.

In some examples, the key diversification value may comprise the counter value. Other non-limiting examples of the key diversification value include: a random nonce generated each time a new diversified key is needed, the random nonce sent from the transmitting device 204 to the receiving device 208; the full value of a counter value sent from the transmitting device 204 and the receiving device 208; a portion of a counter value sent from the transmitting device 204 and the receiving device 208; a counter independently maintained by the transmitting device 204 and the receiving device 208 but not sent between the two devices; a one-time-passcode exchanged between the transmitting device 204 and the receiving device 208; and a cryptographic hash of the sensitive data. In some examples, one or more portions of the key diversification value may be used by the parties to create multiple diversified keys. For example, a counter may be used as the key diversification value. Further, a combination of one or more of the exemplary key diversification values described above may be used.

In another example, a portion of the counter may be used as the key diversification value. If multiple master key values are shared between the parties, the multiple diversified key values may be obtained by the systems and processes described herein. A new diversification value, and therefore a new diversified symmetric key, may be created as often as needed. In the most secure case, a new diversification value may be created for each exchange of sensitive data between the transmitting device 204 and the receiving device 208. In effect, this may create a one-time use key, such as a single-use session key.

Figure 3:
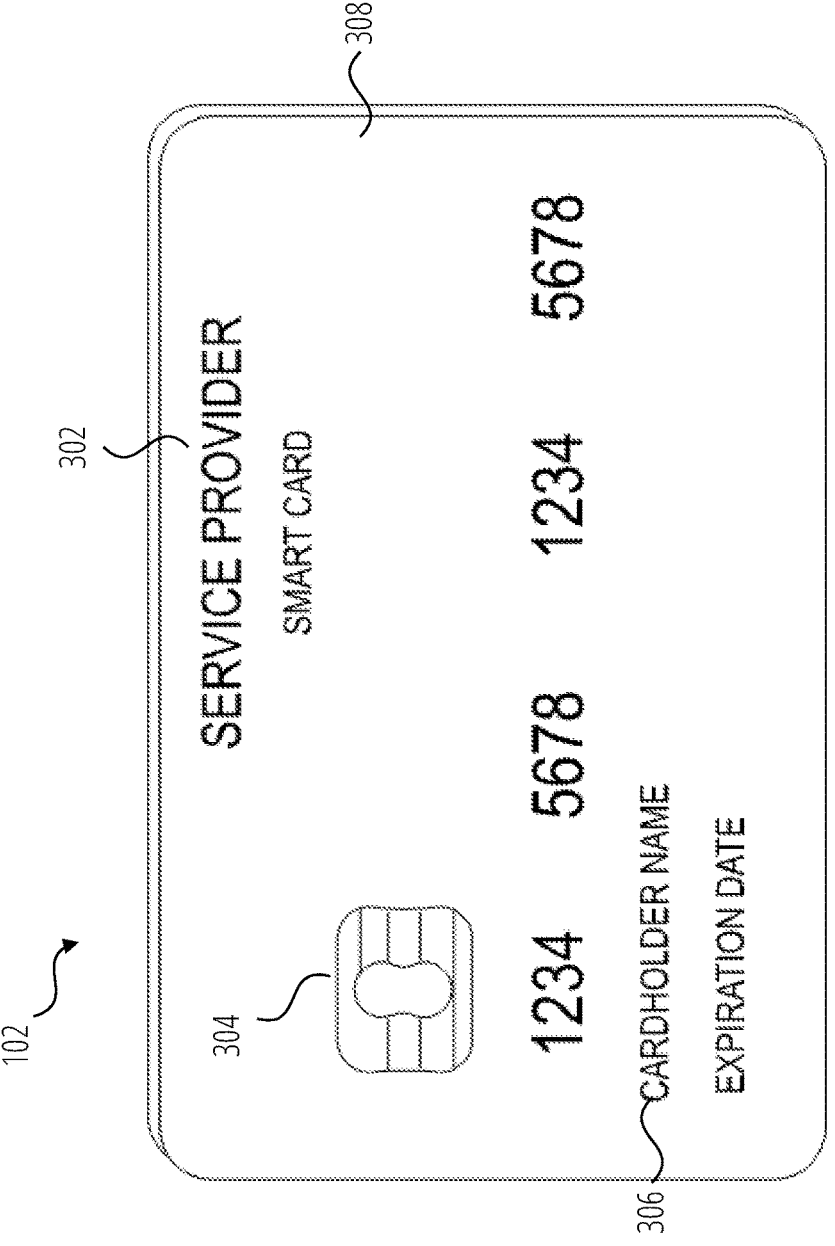
FIG. 3 illustrates an example of a contactless card in accordance with one embodiment.

FIG. 3 illustrates an example configuration of a contactless card 102, which may include a contactless card, or a payment card, such as a credit card, debit card, or gift card, issued by a service provider as displayed as service provider indicia 302 on the front or back of the contactless card 102. In some examples, the contactless card 102 is not related to a payment card and may include, without limitation, an identification card. In some examples, the transaction card may include a dual interface contactless payment card, a rewards card, and so forth. The contactless card 102 may include a substrate 308, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 102 may have physical characteristics compliant with the ID-1 format of the International Organization for Standardization/International Electrotechnical 7816 (ISO/IEC 7816) standard, and the transaction card may otherwise be compliant with the ISO/IEC 14443 standard. However, it is understood that the contactless card 102 according to the present disclosure may have different characteristics, and the present disclosure does not require a transaction card to be implemented in a payment card.

The contactless card 102 may also include identification information 306 displayed on the front and/or back of the card and a contact pad 304. The contact pad 304 may include one or more pads and be configured to establish contact with another client device, such as an Automated Teller Machine (ATM), a user device, smartphone, laptop, desktop, or tablet computer via transaction cards. The contact pad 304 may be designed in accordance with one or more standards, such as thr ISO/IEC 7816 standard, and enable communication in accordance with the EMV protocol. The contactless card 102 may also include processing circuitry, antenna and other components as will be further discussed in FIG. 4. These components may be located behind the contact pad 304 or elsewhere on the substrate 308, e.g., within a different layer of the substrate 308, and may be electrically and physically coupled with the contact pad 304. The contactless card 102 may also include a magnetic strip or tape, which may be located on the back of the card (not shown in FIG. 3). The contactless card 102 may also include an NFC device coupled with an antenna capable of communicating via the NFC protocol. Embodiments are not limited in this manner.

Figure 4:
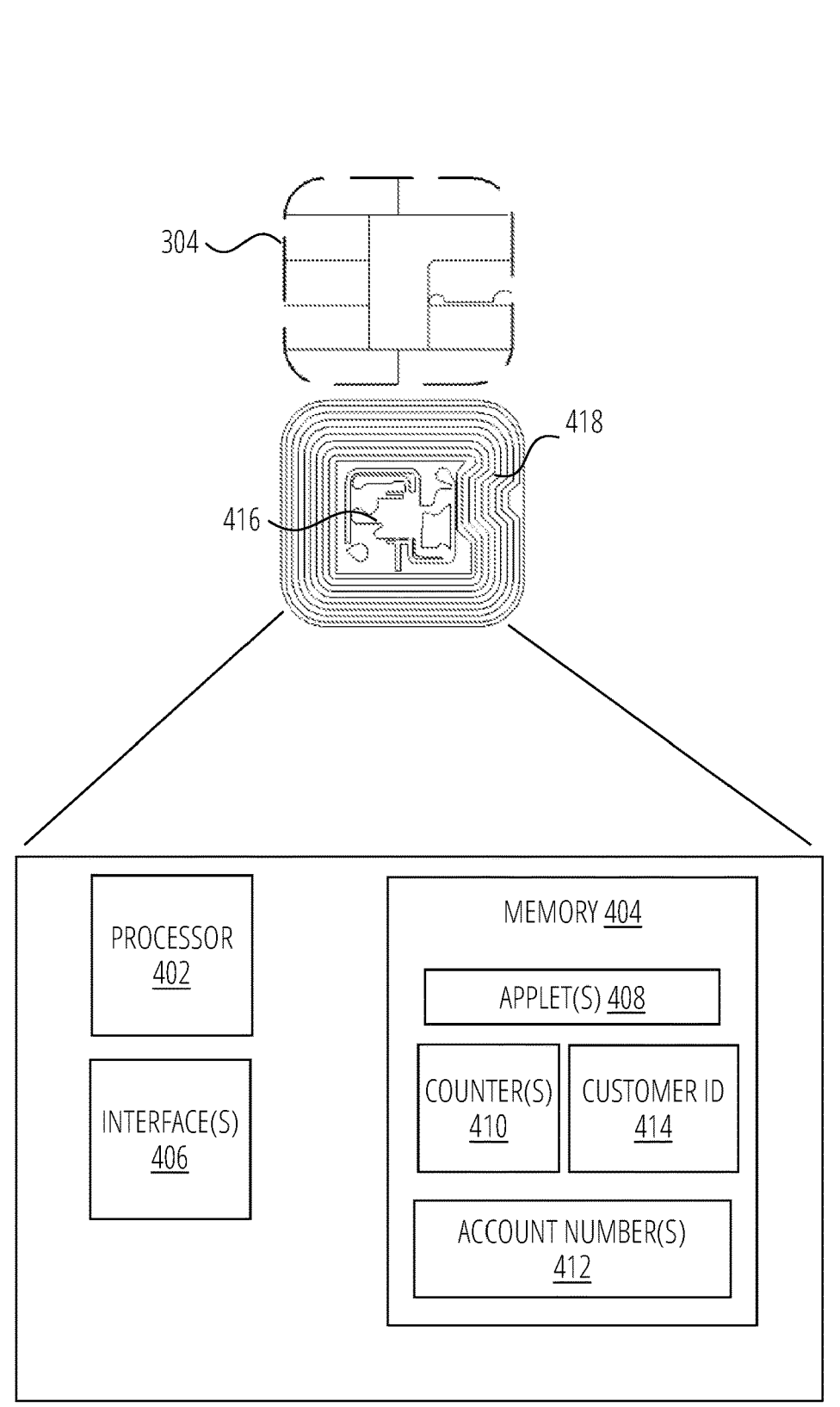
FIG. 4 illustrates an example of a transaction card component in accordance with one embodiment.

As illustrated in FIG. 4, the contact pad 304 of contactless card 102 may include processing circuitry 416 for storing, processing, and communicating information, including a processor 402, a memory 404, and one or more interface(s) 406. It is understood that the processing circuitry 416 may contain additional components, including processors, memories, error and parity/CRC checkers, data encoders, anticollision algorithms, controllers, command decoders, security primitives and tamperproofing hardware, as necessary to perform the functions described herein.

The memory 404 may be a read-only memory (ROM), write-once read-multiple memory or read/write memory, e.g., random-access memory (RAM), ROM, and electrically erasable programmable ROM (EEPROM), and the contactless card 102 may include one or more of these memories. A ROM may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 404 may be encrypted memory utilizing an encryption algorithm executed by the processor 402 to encrypt data.

The memory 404 may be configured to store one or more applet(s) 408, one or more counter(s) 410, a customer identifier 414, and the account number(s) 412, which may be virtual account numbers. The one or more applet(s) 408 may comprise one or more software applications configured to execute on one or more contactless cards, such as a Java® Card applet. However, it is understood that applet(s) 408 are not limited to Java Card applets, and instead may be any software application operable on contactless cards or other devices having limited memory. The one or more counter(s) 410 may comprise a numeric counter sufficient to store an integer. The customer identifier 414 may comprise a unique alphanumeric identifier assigned to a user of the contactless card 102, and the customer identifier 414 may distinguish the user of the contactless card from other contactless card users. In some examples, the customer identifier 414 may identify both a customer and an account assigned to that customer and may further identify the contactless card 102 associated with the customer's account. As stated, the account number(s) 412 may include thousands of one-time use virtual account numbers associated with the contactless card 102. An applet(s) 408 of the contactless card 102 may be configured to manage the account number(s) 412 (e.g., to select an account number(s) 412, mark the selected account number(s) 412 as used, and transmit the account number(s) 412 to a mobile device for autofilling by an autofilling service).

The processor 402 and memory 404 elements of the foregoing exemplary embodiments are described with reference to the contact pad 304, but the present disclosure is not limited thereto. It is understood that these elements may be implemented outside of the contact pad 304 or entirely separate from it, or as further elements in addition to processor 402 and memory 404 elements located within the contact pad 304.

In some examples, the contactless card 102 may comprise one or more antenna(s) 418. The one or more antenna(s) 418 may be placed within the contactless card 102 and around the processing circuitry 416 of the contact pad 304. For example, the one or more antenna(s) 418 may be integral with the processing circuitry 416 and the one or more antenna(s) 418 may be used with an external booster coil. As another example, the one or more antenna(s) 418 may be external to the contact pad 304 and the processing circuitry 416.

In an embodiment, the coil of contactless card 102 may act as the secondary of an air core transformer. A terminal may communicate with the contactless card 102 by cutting power or amplitude modulation. The contactless card 102 may infer the data transmitted from the terminal using the gaps in the contactless card's power connection, which may be functionally maintained through one or more capacitors. The contactless card 102 may communicate back by switching a load on the contactless card's coil or load modulation. Load modulation may be detected in the terminal's coil through interference. More generally, using the antenna(s) 418, processor 402, and/or the memory 404, the contactless card 102 provides a communications interface to communicate via NFC, Bluetooth, and/or Wi-Fi communications.

As explained above, contactless card 102 may be built on a software platform operable on smart cards or other devices having limited memory, such as JavaCard, and one or more or more applications or applets may be securely executed. Applet(s) 408 may be added to contactless cards to provide a one-time password (OTP) for multifactor authentication (MFA) in various mobile application-based use cases. Applet(s) 408 may be configured to respond to one or more requests, such as near field data exchange requests, from a reader, such as a mobile NFC reader (e.g., of a mobile device or point-of-sale terminal), and produce an NFC Data Exchange Format (NDEF) message that comprises a cryptographically secure OTP encoded as an NDEF text tag.

One example of an NDEF OTP is an NDEF short-record layout (SR=1). In such an example, one or more applet(s) 408 may be configured to encode the OTP as an NDEF type 4 well known type text tag. In some examples, NDEF messages may comprise one or more records. The applet(s) 408 may be configured to add one or more static tag records in addition to the OTP record.

In some examples, the one or more applet(s) 408 may be configured to emulate an RFID tag. The RFID tag may include one or more polymorphic tags. In some examples, each time the tag is read, different cryptographic data is presented that may indicate the authenticity of the contactless card. Based on the one or more applet(s) 408, an NFC read of the tag may be processed, the data may be transmitted to a server, such as a server of a banking system, and the data may be validated at the server.

In some examples, the contactless card 102 and the server may include certain data such that the card may be properly identified. The contactless card 102 may include one or more unique identifiers (not pictured). Each time a read operation takes place, the counter(s) 410 may be configured to increment. In some examples, each time data from the contactless card 102 is read (e.g., by a mobile device), the counter(s) 410 is transmitted to the server for validation and determines whether the counter(s) 410 are equal (as part of the validation) to a counter of the server.

The one or more counter(s) 410 may be configured to prevent a replay attack. For example, if a cryptogram has been obtained and replayed, that cryptogram is immediately rejected if the counter(s) 410 has been read or used or otherwise passed over. If the counter(s) 410 has not been used, it may be replayed. In some examples, the counter that is incremented on the card is different from the counter that is incremented for transactions. The contactless card 102 is unable to determine the application transaction counter(s) 410 since there is no communication between applet(s) 408 on the contactless card 102.

In some examples, the counter(s) 410 may get out of sync. In some examples, to account for accidental reads that initiate transactions, such as reading at an angle, the counter(s) 410 may increment but the application does not process the counter(s) 410. In some examples, when a mobile device 104 is woken up, NFC may be enabled and the device 104 may be configured to read available tags, but no action is taken responsive to the reads.

To keep the counter(s) 410 in sync, an application, such as a background application, may be executed that would be configured to detect when the mobile device 104 wakes up and synchronizes with the server of a banking system indicating that a read that occurred due to detection to then move the counter 410 forward. In other examples, Hashed One Time Password may be utilized such that a window of mis-synchronization may be accepted. For example, if within a threshold of 10, the counter(s) 410 may be configured to move forward. But if within a different threshold number, for example within 10 or 1000, a request for performing re-synchronization may be processed, which requests via one or more applications that the user tap, gesture, or otherwise indicate one or more times via the user's device. If the counter(s) 410 increases in the appropriate sequence, then it possible to know that the user has done so.

The key diversification technique described herein with reference to the counter(s) 410, master key, and diversified key, is one example of encryption and/or decryption in a key diversification technique. This example key diversification technique should not be considered limiting of the disclosure, as the disclosure is equally applicable to other types of key diversification techniques.

During the creation process of the contactless card 102, two cryptographic keys may be assigned uniquely per card. The cryptographic keys may comprise symmetric keys which may be used in both encryption and decryption of data. The 3DES algorithm may be used by EMV, and it is implemented by hardware in the contactless card 102. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 102 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal American Standard Code for Information Interchange (ASCII) format. In another example, the NDEF record may be encoded in hexadecimal format.

Figure 5:
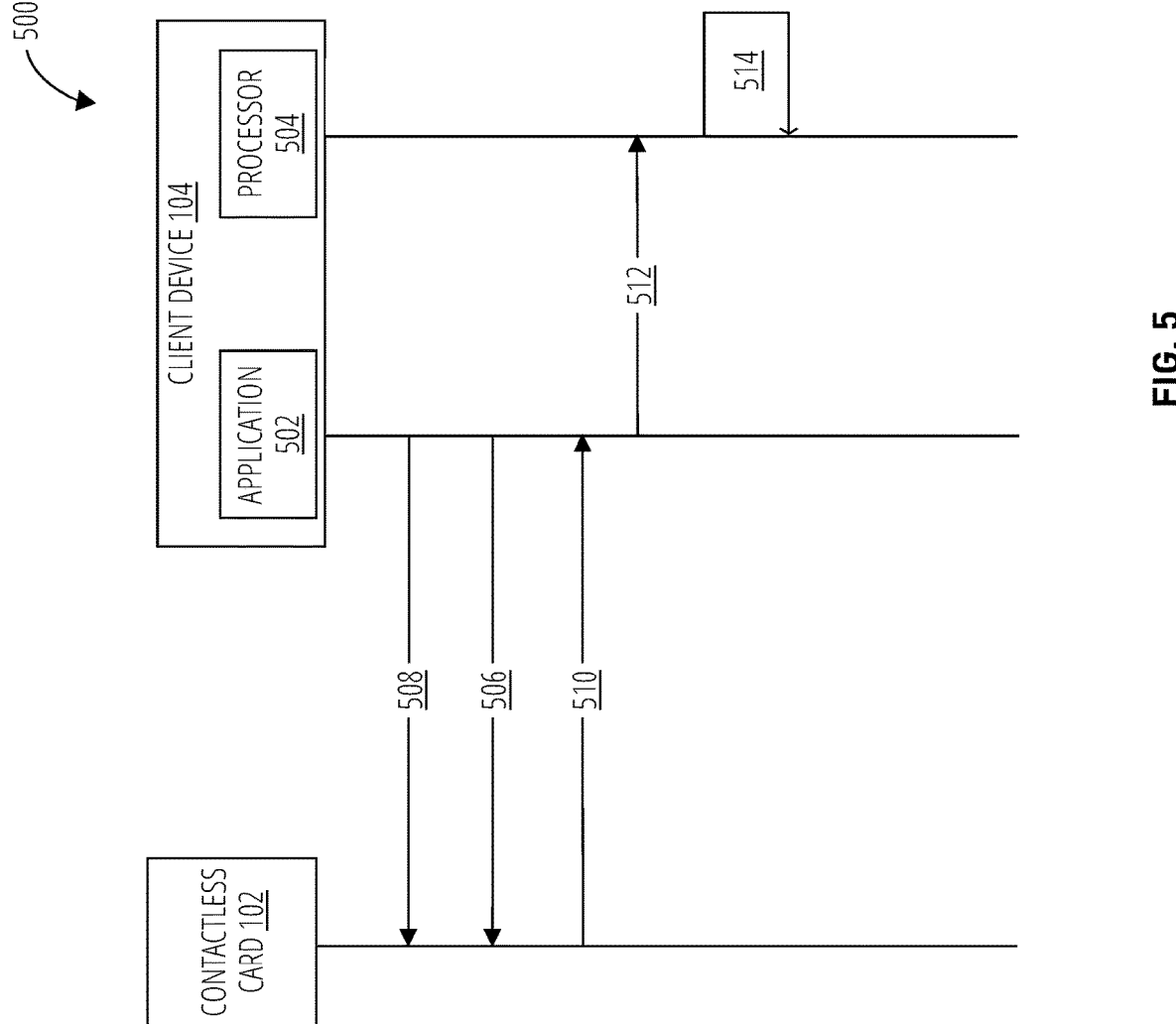
FIG. 5 illustrates an example of a sequence flow in accordance with one embodiment.

FIG. 5 is a timing diagram illustrating an example sequence for providing authenticated access according to one or more embodiments of the present disclosure. Sequence flow 500 may include contactless card 102 and client device 104, which may include an application 502 and processor 504.

At line 508, the application 502 communicates with the contactless card 102 (e.g., after being brought near the contactless card 102). Communication between the application 502 and the contactless card 102 may involve the contactless card 102 being sufficiently close to a card reader (not shown) of the client device 104 to enable NFC data transfer between the application 502 and the contactless card 102.

At line 506, after communication has been established between client device 104 and contactless card 102, contactless card 102 generates a MAC cryptogram. In some examples, this may occur when the contactless card 102 is read by the application 502. In particular, this may occur upon a read, such as an NFC read, of an NDEF tag. For example, a reader application, such as application 502, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file." At this point, a counter value maintained by the contactless card 102 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string). In some examples, application 502 may be configured to transmit a request to contactless card 102, the request comprising an instruction to generate a MAC cryptogram.

At line 510, the contactless card 102 sends the MAC cryptogram to the application 502. In some examples, the transmission of the MAC cryptogram occurs via NFC, however, the present disclosure is not limited thereto. In other examples, this communication may occur via Bluetooth, Wi-Fi, or other means of wireless data communication. At line 512, the application 502 communicates the MAC cryptogram to the processor 504.

At line 514, the processor 504 verifies the MAC cryptogram pursuant to an instruction from the application 502. For example, the MAC cryptogram may be verified, as explained below. In some examples, verifying the MAC cryptogram may be performed by a device other than client device 104, such as a server of a banking system in data communication with the client device 104. For example, processor 504 may output the MAC cryptogram for transmission to the server of the banking system, which may verify the MAC cryptogram. In some examples, the MAC cryptogram may function as a digital signature for purposes of verification. Other digital signature algorithms, such as public key asymmetric algorithms, e.g., the Digital Signature Algorithm and the Rivest-Shamir-Adelman (RSA) algorithm, or zero knowledge protocols, may be used to perform this verification.

Figure 6:
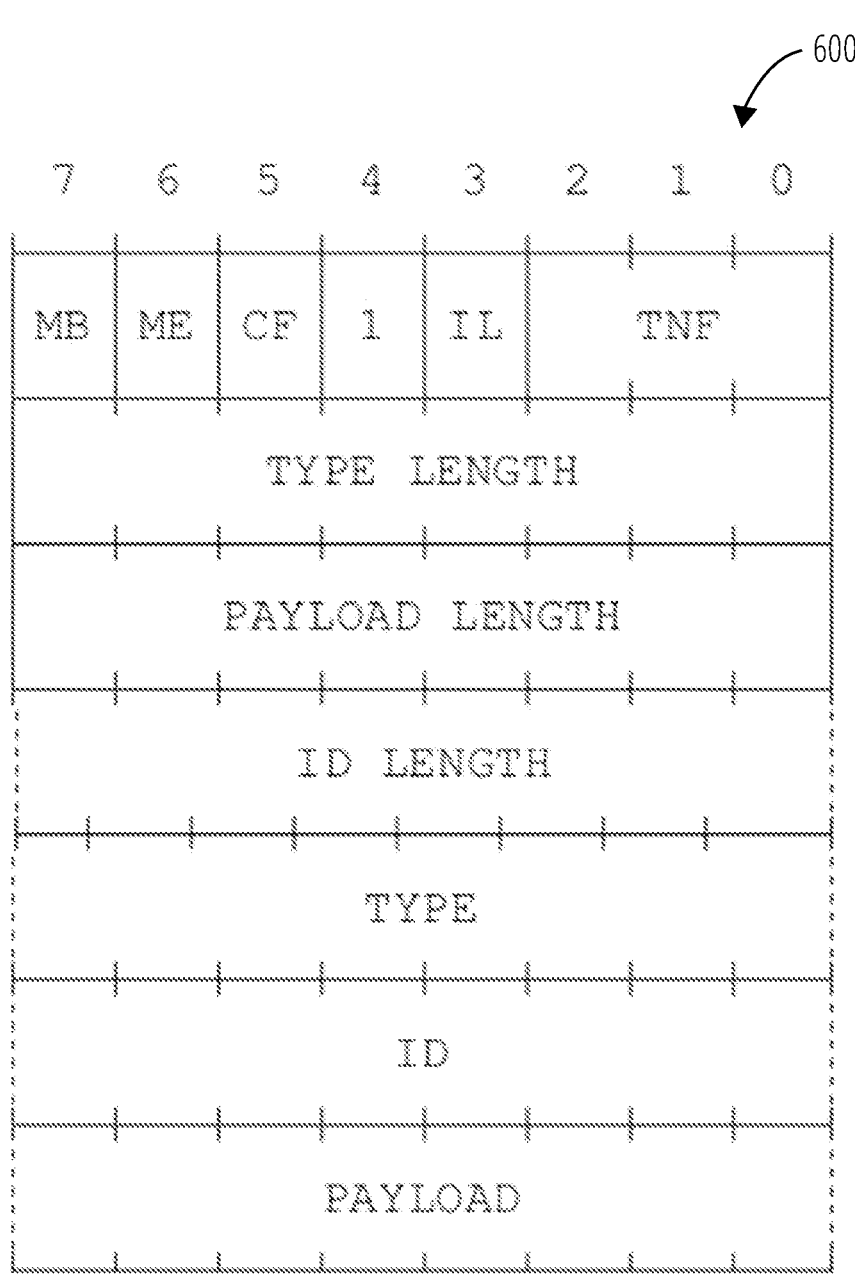
FIG. 6 illustrates an example of a data structure in accordance with one embodiment.

FIG. 6 illustrates an NDEF short-record layout (SR=1) data structure 600 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data.

FIG. 7 illustrates a system 700 configured to implement one or more embodiments of the present disclosure. As explained below, during the contactless card creation process, two cryptographic keys may be assigned uniquely for each card. The cryptographic keys may comprise symmetric keys which may be used in both encryption and decryption of data. The 3DES algorithm may be used by EMV, and it is implemented by hardware in the contactless card. By using a key diversification process, one or more keys may be derived from a master key based upon uniquely identifiable information for each entity that requires a key.

Regarding master key management, two issuer master keys 702, 726 may be required for each part of the portfolio on which the one or more applets is issued. For example, the first master key 702 may comprise an Issuer Cryptogram Generation/Authentication Key (Iss-Key-Auth) and the second master key 726 may comprise an Issuer Data Encryption Key (Iss-Key-DEK). As further explained herein, two issuer master keys 702, 726 are diversified into card master keys 708, 720, which are unique for each card. In some examples, a network profile record ID (pNPR) 722 and derivation key index (pDKI) 724, as back-office data, may be used to identify which Issuer Master Keys 702, 726 to use in the cryptographic processes for authentication. The system performing the authentication may be configured to retrieve values of pNPR 722 and pDKI 724 for a contactless card at the time of authentication.

In some examples, to increase the security of the solution, a session key may be derived (such as a unique key per session) but rather than using the master key, the unique card-derived keys and the counter may be used as diversification data, as explained above. For example, each time the card is used in operation, a different key may be used for creating the message authentication code (MAC) and for performing the encryption. Regarding session key generation, the keys used to generate the cryptogram and encipher the data in the one or more applets may comprise session keys based on the card unique keys (Card-Key-Auth 708 and Card-Key-Dek 720). The session keys (Aut-Session-Key 732 and a data encryption key (DEK-Session-Key 710)) may be generated by the one or more applets and derived by using the application transaction counter (pATC) 704 with one or more algorithms. To fit data into the one or more algorithms, only the 2 low order bytes of the 4-byte pATC 704 is used. In some examples, the four byte session key derivation method may comprise: F1:=PATC (lower 2 bytes) ‖'F0'‖'00'‖PATC (four bytes) F1:=PATC (lower 2 bytes) ‖'0F'‖'00'‖PATC (four bytes) SK:={(ALG (MK) [F1])‖ALG (MK) [F2]}, where ALG may include 3DES Electronic Code Book (ECB) and MK may include the card unique derived master key.

As described herein, one or more MAC session keys may be derived using the lower two bytes of pATC 704. At each tap of the contactless card, pATC 704 is configured to be updated, and the card master keys Card-Key-AUTH 708 and Card-Key-DEK 720 are further diversified into the session keys Aut-Session-Key 732 and DEK-Session-KEY 710. pATC 704 may be initialized to zero at personalization or applet initialization time. In some examples, pATC 704 may be initialized at or before personalization and may be configured to increment by one at each NDEF read.

Further, the update for each card may be unique, and assigned either by personalization, or algorithmically assigned by pUID or other identifying information. For example, odd numbered cards may increment or decrement by 2 and even numbered cards may increment or decrement by 5. In some examples, the update may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In some examples, only the authentication data and an 8-byte random number followed by MAC of the authentication data may be included. In some examples, the random number may precede cryptogram A and may be one block long. In other examples, there may be no restriction on the length of the random number. In further examples, the total data (i.e., the random number plus the cryptogram) may be a multiple of the block size. In these examples, an additional 8-byte block may be added to match the block produced by the MAC algorithm. As another example, if the algorithms employed used 16-byte blocks, even multiples of that block size may be used, or the output may be automatically, or manually, padded to a multiple of that block size.

The MAC may be performed by a function key (AUT-Session-Key) 732. The data specified in cryptogram may be processed with javacard.signature method: ALG_DES_MAC8_ISO9797_1_M2_ALG3 to correlate to EMV Authorization Request Cryptogram (ARQC) verification methods. The key used for this computation may comprise a session key AUT-Session-Key 732, as explained above. As explained above, the low order two bytes of the counter may be used to diversify for the one or more MAC session keys. As explained below, AUT-Session-Key 732 may be used to encrypt MAC data 706, and the resulting data or cryptogram A 714 and random number RND may be encrypted using DEK-Session-Key 710 to create cryptogram B or output 718 sent in the message.

In some examples, one or more hardware security module (HSM) commands may be processed for decrypting such that the final 16 (binary, 32 hex) bytes may comprise a 3DES symmetric encrypting using cipher-block chaining (CBC) mode with a zero IV of the random number followed by MAC authentication data. The key used for this encryption may comprise a session key DEK-Session-Key 710 derived from the Card-Key-DEK 720. In this case, the ATC value for the session key derivation is the least significant byte of the pATC 704.

The format below represents a binary version example embodiment. Further, in some examples, the first byte may be set to ASCII 'A'.

| Message Format | | | | |
| --- | --- | --- | --- | --- |
| 1 | 2 | 4 | 8 | 8 |
| 0x43 (Message Type 'A') | Version | pATC | RND | Cryptogram A (MAC) |
| Cryptogram A (MAC) | 8 bytes | | | |

-continued

| MAC of | | | | |
|---|---|---|---|---|
| 2 | 8 | 4 | 4 | 18 bytes input data |
| Version | pUID | pATC | Shared Secret | |
| Message Format | | | | |
| 1 | 2 | 4 | 16 | |
| 0x43 (Message Type 'A') | Version | pATC | Cryptogram B | |
| Cryptogram A (MAC) | 8 bytes | | | |
| MAC of | | | | |
| 2 | 8 | 4 | 4 | 18 bytes input data |
| Version | pUID | pATC | Shared Secret | |
| Cryptogram B | 16 | | | |
| Sym Encryption of | | | | |
| 8 | 8 | | | |
| RND | Cryptogram A | | | |

Another exemplary format is shown below. In this example, the tag may be encoded in hexadecimal format.

| Message Format | | | | |
|---|---|---|---|---|
| 2 | 8 | 4 | 8 | 8 |
| Version | pUID | pATC | RND | Cryptogram A (MAC) |
| 8 bytes | | | | |
| 8 | 8 | 4 | 4 | 18 bytes input data |
| pUID | pUID | pATC | Shared Secret | |
| Message Format | | | | |
| 2 | 8 | 4 | 16 | |
| Version | pUID | pATC | Cryptogram B | |
| 8 bytes | | | | |
| 8 | | 4 | 4 | 18 bytes input data |
| pUID | pUID | pATC | Shared Secret | |
| Cryptogram B | 16 | | | |
| Sym Encryption of | | | | |
| 8 | 8 | | | |
| RND | Cryptogram A | | | |

The unique identifier (UID) field of the received message may be extracted to derive, from master keys Iss-Key-AUTH 702 and Iss-Key-DEK 726, the card master keys (Card-Key-Auth 708 and Card-Key-DEK 720) for that particular card. Using the card master keys (Card-Key-Auth 708 and Card-Key-DEK 720), the counter (pATC) field of the received message may be used to derive the session keys (Aut-Session-Key 732 and DEK-Session-Key 710) for that particular card. Cryptogram B 718 may be decrypted using the DEK-Session-KEY, which yields cryptogram A 714 and RND, and RND may be discarded. The UID field may be used to look up the shared secret of the contactless card which, along with the Ver, UID, and pATC fields of the message, may be processed through the cryptographic MAC using the re-created Aut-Session-Key to create a MAC output, such as MAC'. If MAC' is the same as cryptogram A 714, then this indicates that the message decryption and MAC checking have all passed. Then the pATC may be read to determine if it is valid.

During an authentication session, one or more cryptograms may be generated by the one or more applications.

For example, the one or more cryptograms may be generated as a 3DES MAC using ISO 9797-1 Algorithm 3 with Method 2 padding via one or more session keys, such as Aut-Session-Key 732. The input data 706 may take the following form: Version (2), pUID (8), pATC (4), Shared Secret (4). In some examples, the numbers in the brackets may comprise length in bytes. In some examples, the shared secret may be generated by one or more random number generators which may be configured to ensure, through one or more secure processes, that the random number is unpredictable. In some examples, the shared secret may comprise a random 4-byte binary number injected into the card at personalization time that is known by the authentication service. During an authentication session, the shared secret may not be provided from the one or more applets to the mobile application. Method 2 padding may include adding a mandatory 0x'80' byte to the end of input data and 0x' 00' bytes that may be added to the end of the resulting data up to the 8-byte boundary. The resulting cryptogram may comprise 8 bytes in length.

In some examples, one benefit of encrypting an unshared random number as the first block with the MAC cryptogram is that it acts as an initialization vector while using CBC mode of the symmetric encryption algorithm. This allows the "scrambling" from block to block without having to pre-establish either a fixed or dynamic IV.

By including the application transaction counter (pATC) as part of the data included in the MAC cryptogram, the authentication service may be configured to determine if the value conveyed in the clear data has been tampered with. Moreover, by including the version in the one or more cryptograms, it is difficult for an attacker to purposefully misrepresent the application version in an attempt to downgrade the strength of the cryptographic solution. In some examples, the pATC may start at zero and be updated by 1 each time the one or more applications generates authentication data. The authentication service may be configured to track the pATCs used during authentication sessions. In some examples, when the authentication data uses a pATC equal to or lower than the previous value received by the authentication service, this may be interpreted as an attempt to replay an old message, and the authentication may be rejected. In some examples, where the pATC is greater than the previous value received, this may be evaluated to determine if it is within an acceptable range or threshold, and if it exceeds or is outside the range or threshold, verification may be deemed to have failed or be unreliable. In the MAC operation 712, data 706 is processed through the MAC using Aut-Session-Key 732 to produce MAC output (cryptogram A) 714, which is encrypted.

In order to provide additional protection against brute force attacks exposing the keys on the card, it is desirable that cryptogram A 714 be enciphered. In some examples, data or cryptogram A 714 to be included in the ciphertext may comprise: Random number (8), cryptogram (8). In some examples, the numbers in the brackets may comprise length in bytes. In some examples, the random number may be generated by one or more random number generators which may be configured to ensure, through one or more secure processes, that the random number is unpredictable. The key used to encipher this data may comprise a session key. For example, the session key may comprise DEK-Session-Key 710. In the encryption operation 716, data or cryptogram A 714 and RND are processed using DEK-Session-Key 710 to produce encrypted data, cryptogram B 718. Cryptogram A 714 may be enciphered using 3DES in CBC mode to ensure that an attacker must run any attacks over all of the ciphertext. As a non-limiting example, other algorithms, such as Advanced Encryption Standard (AES), may be used. In some examples, an initialization vector of 0x'0000000000000000' may be used. Any attacker seeking to brute force the key used for enciphering this data will be unable to determine when the correct key has been used, as correctly decrypted data will be indistinguishable from incorrectly decrypted data due to its random appearance.

In order for the authentication service to validate the one or more cryptograms provided by the one or more applets, the following data must be conveyed from the one or more applets to the mobile device in the clear during an authentication session: version number to determine the cryptographic approach used and message format for validation of the cryptogram, which enables the approach to change in the future; pUID to retrieve cryptographic assets and derive the card keys; and pATC to derive the session key used for the cryptogram.

FIG. 8 illustrates a method 800 for generating a cryptogram. For example, at block 802, a network profile record ID (pNPR) and derivation key index (pDKI) may be used to identify which Issuer Master Keys to use in the cryptographic processes for authentication. In some examples, the method may include performing the authentication to retrieve values of pNPR and pDKI for a contactless card at the time of authentication.

At block 804, Issuer Master Keys may be diversified by combining them with the card's unique ID number (pUID) and the PAN sequence number (PSN) of one or more applets, for example, a payment applet.

At block 806, Card-Key-Auth and Card-Key-DEK (unique card keys) may be created by diversifying the Issuer Master Keys to generate session keys which may be used to generate a MAC cryptogram.

At block 808, the keys used to generate the cryptogram and encipher the data in the one or more applets may comprise the session keys of block 806 based on the card unique keys (Card-Key-Auth and Card-Key-DEK). In some examples, these session keys may be generated by the one or more applets and derived by using pATC, resulting in session keys Aut-Session-Key and DEK-Session-Key.

FIG. 9 depicts an exemplary process 900 illustrating key diversification according to one example. Initially, a sender and a recipient may be provisioned with two different master keys. For example, a first master key may comprise the data encryption master key, and a second master key may comprise the data integrity master key. The sender has a counter value, which may be updated at block 902, and other data, such as data to be protected, which it may secure share with the recipient.

At block 904, the counter value may be encrypted by the sender using the data encryption master key to produce the data encryption derived session key, and the counter value may also be encrypted by the sender using the data integrity master key to produce the data integrity derived session key. In some examples, a whole counter value or a portion of the counter value may be used during both encryptions.

In some examples, the counter value may not be encrypted. In these examples, the counter may be transmitted between the sender and the recipient in the clear, i.e., without encryption.

At block 906, the data to be protected is processed with a cryptographic MAC operation by the sender using the data integrity session key and a cryptographic MAC algorithm. The protected data, including plaintext and shared secret, may be used to produce a MAC using one of the session keys (AUT-Session-Key).

At block 908, the data to be protected may be encrypted by the sender using the data encryption derived session key in conjunction with a symmetric encryption algorithm. In some examples, the MAC is combined with an equal amount of random data, for example, each 8 bytes long, and then encrypted using the second session key (DEK-Session-Key).

At block 910, the encrypted MAC is transmitted, from the sender to the recipient, with sufficient information to identify additional secret information (such as shared secret, master keys, etc.), for verification of the cryptogram.

At block 912, the recipient uses the received counter value to independently derive the two derived session keys from the two master keys as explained above.

At block 914, the data encryption derived session key is used in conjunction with the symmetric decryption operation to decrypt the protected data. Additional processing on the exchanged data will then occur. In some examples, after the MAC is extracted, it is desirable to reproduce and match the MAC. For example, when verifying the cryptogram, it may be decrypted using appropriately generated session keys. The protected data may be reconstructed for verification. A MAC operation may be performed using an appropriately generated session key to determine if it matches the decrypted MAC. As the MAC operation is an irreversible process, the only way to verify is to attempt to recreate it from source data.

At block 916, the data integrity derived session key is used in conjunction with the cryptographic MAC operation to verify that the protected data has not been modified.

Some examples of the methods described herein may advantageously confirm when a successful authentication is determined when the following conditions are met. First, the ability to verify the MAC shows that the derived session key was proper. The MAC may only be correct if the decryption was successful and yielded the proper MAC value. The successful decryption may show that the correctly derived encryption key was used to decrypt the encrypted MAC. Since the derived session keys are created using the master keys known only to the sender (e.g., the transmitting device) and the recipient (e.g., the receiving device), it may be trusted that the contactless card which originally created the MAC and encrypted the MAC is indeed authentic. Moreover, the counter value used to derive the first and second session keys may be shown to be valid and may be used to perform authentication operations.

Thereafter, the two derived session keys may be discarded, and the next iteration of data exchange will update the counter value (returning to block 902) and a new set of session keys may be created (at block 910). In some examples, the combined random data may be discarded.

Figure 10:
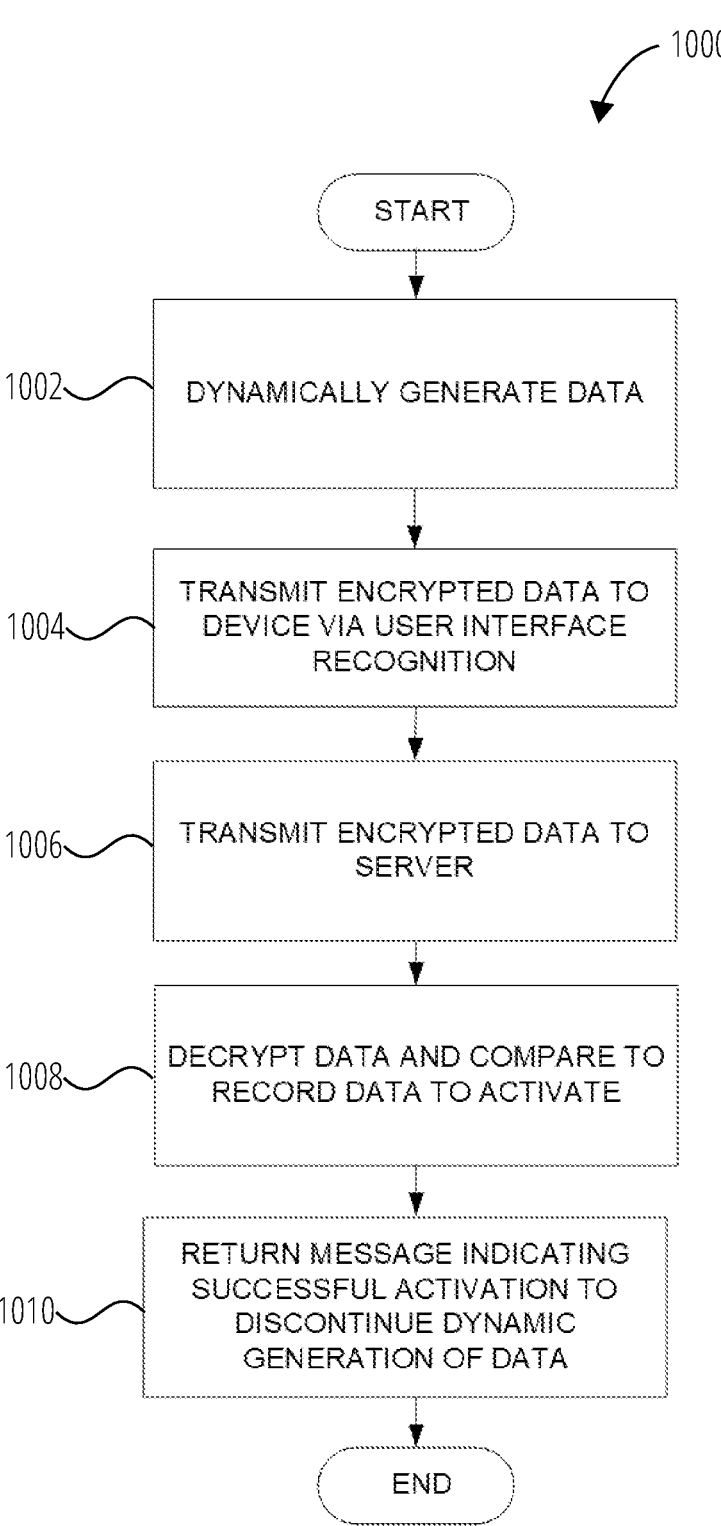
FIG. 10 illustrates an example of a method of card activation in accordance with one embodiment.

FIG. 10 illustrates a method 800 for card activation according to an example embodiment. For example, card activation may be completed by a system including a card, a device, and one or more servers. The contactless card, device, and one or more servers may reference same or similar components that were previously explained, such as contactless card 102, client device 104, and a server.

In block 1002, the card may be configured to dynamically generate data. In some examples, this data may include information such as an account number, card identifier, card verification value, or phone number, which may be transmitted from the card to the device. In some examples, one or more portions of the data may be encrypted via the systems and methods disclosed herein.

In block 1004, one or more portions of the dynamically generated data may be communicated to an application of the device via NFC or other wireless communication. For example, a tap of the card proximate to the device may allow the application of the device to read the one or more portions of the data associated with the contactless card. In some examples, if the device does not comprise an application to assist in activation of the card, the tap of the card may direct the device or prompt the customer to a software application store to download an associated application to activate the card. In some examples, the user may be prompted to sufficiently gesture, place, or orient the card towards a surface of the device, such as either at an angle or flatly placed on, near, or proximate the surface of the device. Responsive to a sufficient gesture, placement and/or orientation of the card, the device may proceed to transmit the one or more encrypted portions of data received from the card to the one or more servers.

In block 1006, the one or more portions of the data may be communicated to one or more servers, such as a card issuer server. For example, one or more encrypted portions of the data may be transmitted from the device to the card issuer server for activation of the card.

In block 1008, the one or more servers may decrypt the one or more encrypted portions of the data via the systems and methods disclosed herein. For example, the one or more servers may receive the encrypted data from the device and may decrypt it in order to compare the received data to record data accessible to the one or more servers. If a resulting comparison of the one or more decrypted portions of the data by the one or more servers yields a successful match, the card may be activated. If the resulting comparison of the one or more decrypted portions of the data by the one or more servers yields an unsuccessful match, one or more processes may take place. For example, responsive to the determination of the unsuccessful match, the user may be prompted to tap, swipe, or wave gesture the card again. In this case, there may be a predetermined threshold comprising a number of attempts that the user is permitted to activate the card. Alternatively, the user may receive a notification, such as a message on his or her device indicative of the unsuccessful attempt of card verification and to call, email or text an associated service for assistance to activate the card, another notification, such as a phone call on his or her device indicative of the unsuccessful attempt of card verification and to call, email or text an associated service for assistance to activate the card, or another notification, such as an email indicative of the unsuccessful attempt of card verification and to call, email or text an associated service for assistance to activate the card.

In block 1010, the one or more servers may transmit a return message based on the successful activation of the card. For example, the device may be configured to receive output from the one or more servers indicative of a successful activation of the card by the one or more servers. The device may be configured to display a message indicating successful activation of the card. Once the card has been activated, the card may be configured to discontinue dynamically generating data so as to avoid fraudulent use. In this manner, the card may not be activated thereafter, and the one or more servers are notified that the card has already been activated.

FIGS. 1-10 are generally directed to systems and methods to authenticate a contactless card based on information on the contactless card. However, as previously discussed, some embodiments disclosed herein can include systems and methods for launching a mobile application or a browser extension responsive to satisfying predetermined conditions. For example, the contactless card can be registered with a mobile device. The contactless card can also be registered with a shopping mobile application and/or a shopping browser extension, such as Capital One Shopping. When the mobile device is being used for shopping via a merchant application, the mobile device can receive a cryptogram from the contactless card, verify the cryptogram—that is, authenticate the contactless card—and when the cryptogram has been verified, launch the shopping mobile application and/or the shopping browser extension. Launching, in this context, can include opening and running the shopping mobile application and/or the shopping browser extension on the mobile device. The predetermined conditions that can be satisfied can include the merchant application running on the mobile device, the mobile device receiving the cryptogram from the contactless card, the contactless card being registered with the mobile device, the contactless card being registered with the shopping mobile application and/or the shopping browser extension, and the mobile device verifying the cryptogram. FIG. 11 to FIG. 14 are generally directed to these embodiments and provide additional details thereof.

Figure 11:
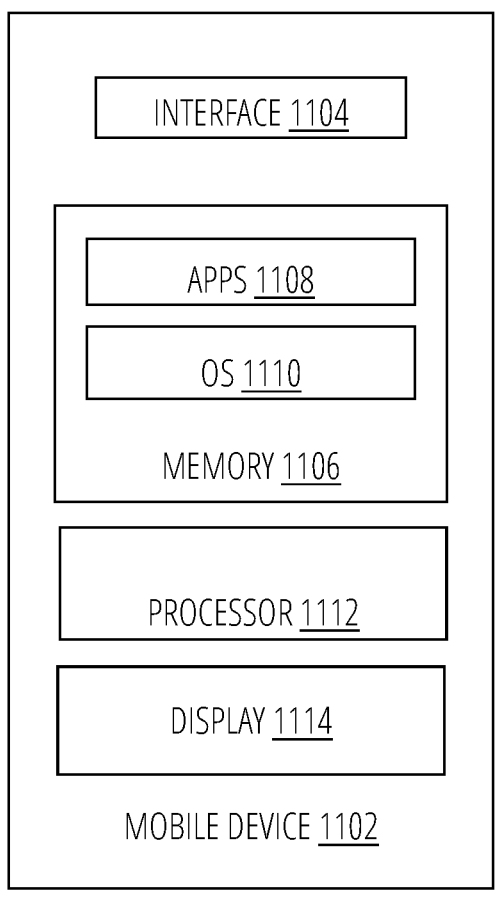
FIG. 11 illustrates an example of a mobile device in accordance with one embodiment.

FIG. 11 is a block diagram that illustrates an example of a mobile device 1102 in accordance with disclosed embodiments. It is to be understood that the mobile device 1102 can be the same as or similar to the client device 104.

As seen, the mobile device 1102 can include an interface 1104, a memory 1106, a processor 1112, and a display device 1114. The memory 1106 can be configured to store computer instructions configured to execute on the processor 1112, and the computer instructions can be part of applications 1108 and/or an operating system 1110. However, embodiments are not limited in this manner.

In some embodiments, the interface 1104 can include one or more antennas, such as a short-range communication antenna, a camera, a scanner, or another device capable of reading information or data within its field of view. Additionally or alternatively, the interface 1104 can include a Wi-Fi interface, a Bluetooth interface, an NFC interface, a serial bus interface, a universal serial bus (USB), and so forth.

In some embodiments, the memory 1106 can be any type of memory configured to store instructions to be processed by the processor 1112. Examples of the memory 1106 can include volatile or non-volatile memory, removable or non-removable memory, erasable or non-erasable memory, writeable or re-writeable memory, and so forth.

In some embodiments, the processor 1112 can be any type of processor, microprocessor, circuit, circuit element (e.g., transistor, resistor, capacitor, inductor, and so forth), integrated circuit, application specific integrated circuit (ASIC), programmable logic device (PLD), digital signal processor (DSP), field programmable gate array (FPGA), multi-core processor, and so forth.

In some embodiments, the display device 1114 can include a display screen or other output device for displaying data, information, and/or graphics to a user of the mobile device 1102.

As explained above, the memory 1106 can include the applications 1108 and/or the operating system 1110. The applications 1108 can include any type of application configured to operate on the mobile device 1102. For example, the applications 1108 can include social networking applications, communication applications, business productivity applications (e.g., email, word processor, spreadsheet, etc.), storefront applications, banking applications, money transfer applications, gaming applications, and so forth. Of particular relevance to some embodiments disclosed herein, the applications 1108 can include merchant applications and shopping mobile applications.

The applications 1108 can be configured to operate within the operating system 1110. In some embodiments, the operating system 1110 can be an Android® operating system, Apple iOS® operating system, Windows Mobile Operating System®, and so forth. The operating system 1110 can be configured to provide services and instructions that execute and enable the applications 1108 to operate with hardware. For example, the operating system 1110 can be configured to operate with the hardware associated with the processor 1112 to process detections made by the interface 1104. In some embodiments, the operating system 1110 can provide data to the applications 1108 processed by the operating system 1110. The applications 1108 can process such data, including performing authentications of the data, communicating the data to other devices or servers, and so forth. In some embodiments, at least a portion of the operating system 1110 can be configured to perform one or more authentication steps. Additionally, at least a portion of the operating system 1110 and/or at least one of the applications 1108 can be understood to pull information, such as merchant information, payment information, and/or cart information, from other ones of the applications 1108.

FIG. 12 is a block diagram that illustrates an example of a system 1200 in accordance with disclosed embodiments. As seen, the system 1200 can include a mobile device 1202 and a contactless card 1204. It is to be understood that the mobile device 1202 can be the same as or similar to the mobile device 1102 and/or the client device 104. It is also to be understood that the contactless card 1204 can be the same as or similar to the contactless card 102. The contactless card 1204 can be registered with the mobile device 1202, and the contactless card 1204 can also be registered with a shopping mobile application and/or a shopping browser extension.

In some embodiments, a user can tap the contactless card 1204 on the mobile device 1202 or otherwise bring the contactless card 1204 within a communication range of the mobile device 1202 to provide an input. For example, when tapped on or within the communication range of the mobile device 1202, the mobile device 1202 can read information or data from the contactless card 1204 and/or the contactless card 1204 can transmit such information or data to the mobile device 1202. In some embodiments, the mobile device 1202 can be configured to request or solicit the information or the data from the contactless card 1204, for example, by displaying a solicitation on a display screen of the mobile device 1202.

In operation, the mobile device 1202 can be configured to process the data received as input from the contactless card 1204, including authentication data and/or signal and communication data, and use such data to authenticate the contactless card 1204 and/or verify the data received from the mobile device 1202. For example, in some embodiments, the authentication data can include a cryptogram from the contactless card 1204, and the mobile device 1202 can successfully decrypt the cryptogram to verify the cryptogram. Additionally or alternatively, in some embodiments, the mobile device 1202 can decrypt protected data in the cryptogram and compare the protected data to record data associated with the contactless card 1204 and stored on the mobile device 1202 and/or a server in communication with the mobile device 1202. When the protected data matches the record data, the mobile device 1202 can verify a customer associated with the contactless card 1204. In some embodiments, the mobile device 1202 can transmit the data received as input and/or the authentication data to the server for verification thereof, for example, as discussed in FIGS. 1-10.

It is to be understood that, in some embodiments, the data received as input from the contactless card 1204 will not be authenticated and/or verified unless the contactless card 1204 has been registered with the mobile device 1202 and/or has been registered with the shopping mobile application and/or the shopping browser extension. In this regard, without such registration, the mobile device 1202 and/or the server may not be capable of decrypting the cryptogram and/or the protected data in the cryptogram, for example, due to lacking required keys and the like. Additionally or alternatively, without such registration, the mobile device 1202 and/or the server may be able to decrypt the cryptogram and/or the protected data in the cryptogram, but may not be able to match the protected data to any record data stored for registered cards. In this regard, when registered, the contactless card 1204 can be associated with the mobile device 1202, the shopping mobile application, and/or the shopping browser extension in a database or data store maintained by the server. As such, the mobile device 1202 can provide the data received as input from the contactless card 1204 as well identifying data, such as identifiers of the mobile device, the shopping mobile application, and/or the shopping browser extension, to the server, and the server can utilize such received information to verify that the contactless cards 1204 is associated with the mobile device 1202, the shopping mobile application, and/or the shopping browser extension.

In some embodiments, responsive to the contactless card 1204 being authenticated, the mobile device 1202 can initiate an action on the mobile device 1202. For example, in some embodiments, the mobile device 1202 can launch the shopping mobile application and/or the shopping browser extension thereon. In some embodiments, the shopping mobile application and/or the shopping browser extension can automatically apply available coupons to items in a cart associated with a merchant application running on the mobile device 1202. For example, the shopping mobile application and/or the shopping browser extension can pull information from the merchant application identifying the items in the cart, search a database or the internet for any available coupons associated with the items in the cart, identify the available coupons associated with the items in the cart, and push the available coupons associated with the items in the cart to the shopping merchant application for application thereof. Additionally or alternatively, in some embodiments, the shopping mobile application and/or the shopping browser extension can automatically search for a better price for the items in the cart associated with the merchant application and display, on the display screen of the mobile device, the better price found at an alternative website. For example, the shopping mobile application and/or the shopping browser extension can pull the information from the merchant application identifying the items in the cart, search a plurality of alternative websites, identify the better price at one of the plurality of alternative websites for the items in the cart, and display the better price and an identification of the one of the plurality of alternative websites.

In some embodiments, the data received as input from the contactless card 1204 can include directions to access the shopping mobile application and/or the shopping browser extension, for example, a uniform resource locator (URL) to visit and/or download the shopping mobile application and/or the shopping browser extension.

Figure 13:
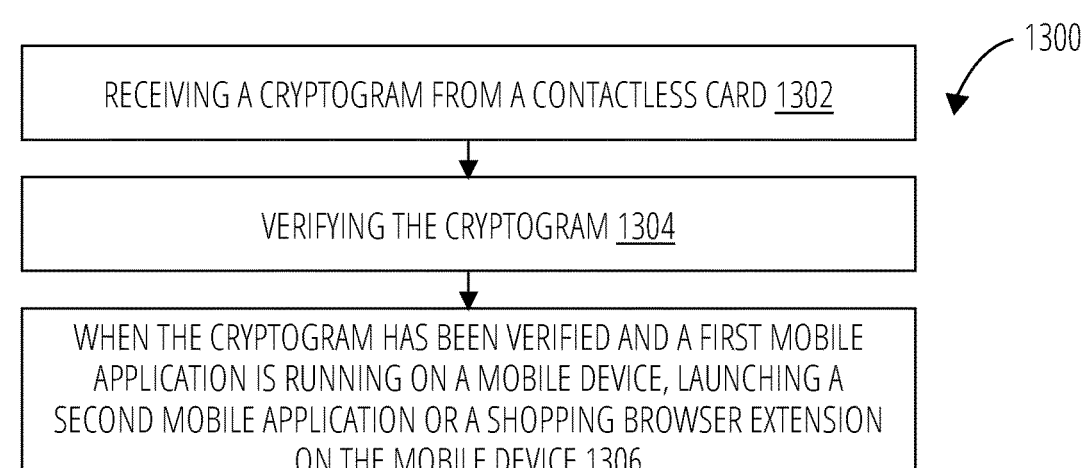
FIG. 13 illustrates an example of a method in accordance with one embodiment.

FIG. 13 is a flow chart that illustrates an example of a method 1300 in accordance with disclosed embodiments. In some embodiments, a mobile device, such as the mobile device 1202, the mobile device 1102, and/or the client device 104, can execute some or all of the method 1300. Additionally or alternatively, a server in communication with the mobile device can execute some or all of the method 1300.

As seen, the method 1300 can include receiving a cryptogram from a contactless card as in 1302. For example, in some embodiments, a short-range communication antenna of the mobile device can receive the cryptogram from the contactless card. In some embodiments, the mobile device can receive the cryptogram responsive to a solicitation for communication with the contactless card displayed on a display screen of the mobile device. For example, in some embodiments, the mobile device can display the solicitation for the communication responsive to the display screen of the mobile device displaying a payment screen associated with a merchant application. Additionally or alternatively, in some embodiments, the mobile device can display the solicitation for the communication responsive to an item being placed in a shopping cart associated with the merchant application.

After receiving the cryptogram from the contactless card, the method 1300 can include verifying the cryptogram as in 1304. For example, in some embodiments, a processor of the mobile device can verify the cryptogram. Additionally or alternatively, in some embodiments, the mobile device can transmit the cryptogram to the server and receive an indication from the server that the cryptogram is verified.

In some embodiments, the mobile device and/or the server can successfully decrypt the cryptogram to verify the cryptogram. Additionally or alternatively, in some embodiments, the mobile device and/or the server can decrypt protected data in the cryptogram and compare the protected data to record data associated with the contactless card and stored on the mobile device and/or the server. When the protected data matches the record data, the mobile device and/or the server can verify a customer associated with the contactless card. In this regard, it is to be understood that verifying the cryptogram, the contactless card, and/or the customer associated with the contactless card can include and incorporate the systems and the methods to authenticate the contactless card based on information on the contactless card as disclosed and described herein.

When the cryptogram has been verified and the merchant application is running on the mobile device, the method 1300 can include launching a shopping mobile application and/or a shopping browser extension on the mobile device. In some embodiments, the shopping mobile application and/or the shopping browser extension can automatically apply available coupons to items in a cart associated with the first mobile application. Additionally or alternatively, in some embodiments, the shopping mobile application and/or the shopping browser extension can automatically search for a better price for items in a cart associated with the merchant application, and the display screen of the mobile device can display the better price found at an alternative website. In this regard, it is to be understood that the mobile device and some applications running thereon, including the shopping mobile application and/or the shopping browser extension, can pull information, such as merchant information, payment information, and/or cart information, from other applications running on the mobile device, including the merchant application.

Figure 14:
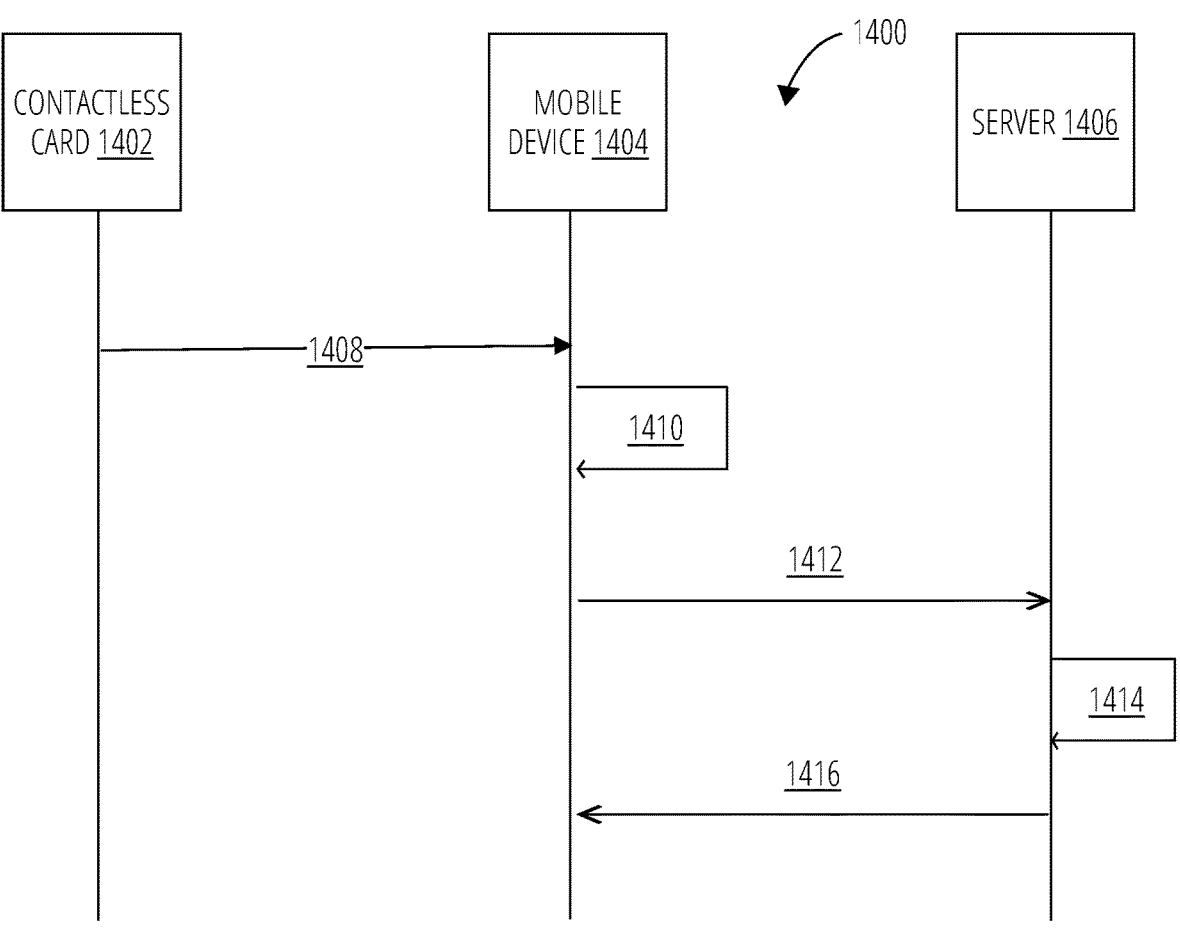
FIG. 14 illustrates an example of a sequence flow in accordance with one embodiment.

FIG. 14 illustrates an example of a sequence flow 1400 in accordance with disclosed embodiments. In some embodiments, verification and/or authentication can be performed by a mobile device 1404. Additionally or alternatively, in some embodiments, verification and/or authentication can be performed by a server 1406.

At 1408, a contactless card 1402 can be tapped on or brought within a communication range of the mobile device 1404 and can exchange information with the mobile device 1404. Line 1408 can represent communication between the contactless card 1402 and the mobile device 1404 and can include authentication data, such as a cryptogram, stored on the contactless card 1402 and provided to the mobile device 1404. In some embodiments, the authentication data can be encrypted in the cryptogram and encrypted using the systems and methods disclosed and described herein, for example, as discussed in FIGS. 1-10.

In some embodiments, communications between the contactless card 1402 and the mobile device 1404 can include NFC communications in accordance with one or more NFC protocols. However, embodiments disclosed herein are not so limited and can include other wireless technologies in addition to NFC or as an alternative to NFC, such as other short-range communication protocols.

At 1410, the mobile device 1404 can process the authentication data and any other data received from the contactless card 1402. For example, in some embodiments, the mobile device 1404 can verify the cryptogram received from the contactless card 1402. Additionally or alternatively, the mobile device 1404 can operate as a pass-through and transmit the authentication data and/or the cryptogram to the server 1406 for verification and/or authentication.

At 1412, the mobile device 1404 can transmit information to the server 1406. For example, in some embodiments, the mobile device 1404 can transmit the information received from the contactless card 1402 to the server 1406 as received. However, in some embodiments, the mobile device 1404 can process the information received from the contactless card 1402, either partially or fully, and transmit the information received from the contactless card 1402 to the server 1406 as processed, for example, protected data or keys either partially or fully decrypted. Additionally or alternatively, in some embodiments, the mobile device 1404 can transmit an information request to the server 1406 soliciting data stored on the server 1406, such as record data, for comparison to the authentication data in the information received from the contactless card 1402. In some embodiments, the mobile device 1404 can store the record data thereon for comparison with the protected data.

The mobile device 1404 can transmit the information to the server 1406 via one or more wireless and/or wired connections. For example, in some embodiments, the mobile device 1404 can transmit the information to one or more application program interfaces (APIs) hosted by the server 1406. Additionally or alternatively, in some embodiments, the mobile device 1404 can transmit the information to one or more application program interfaces (APIs) hosted by a third party, such as a cloud-computing provider.

At 1414, the server 1406 can process the information received from the mobile device 1404. For example, in some embodiments, the server 1406 can verify the cryptogram and/or the authentication data received from the mobile device 1404. In this regard, the server 1406 can process the information received from the mobile device 1404, either partially or fully. Additionally or alternatively, in some embodiments, the server 1406 can compare the protected data with the record data stored on the server 1406.

At 1416, the server 1406 can transmit information to the mobile device 1404. For example, the server 1406 can transmit an indication that the cryptogram is verified, can transmit the protected data or other data that the server 1406 decrypted from the cryptogram, can transmit the record data stored on the server 1406, and/or can transmit an indication of results from comparing the protected data with the record data.

Upon verifying the cryptogram received from the contactless card 1402 and/or upon receipt of the information from the server 1406 and completion of any further processing necessary to verify the cryptogram received from the contactless card 1402, the mobile device 1404 can initiate an action that required the cryptogram to be verified, such as launching a shopping mobile application and/or a shopping browser extension.

Figure 15:
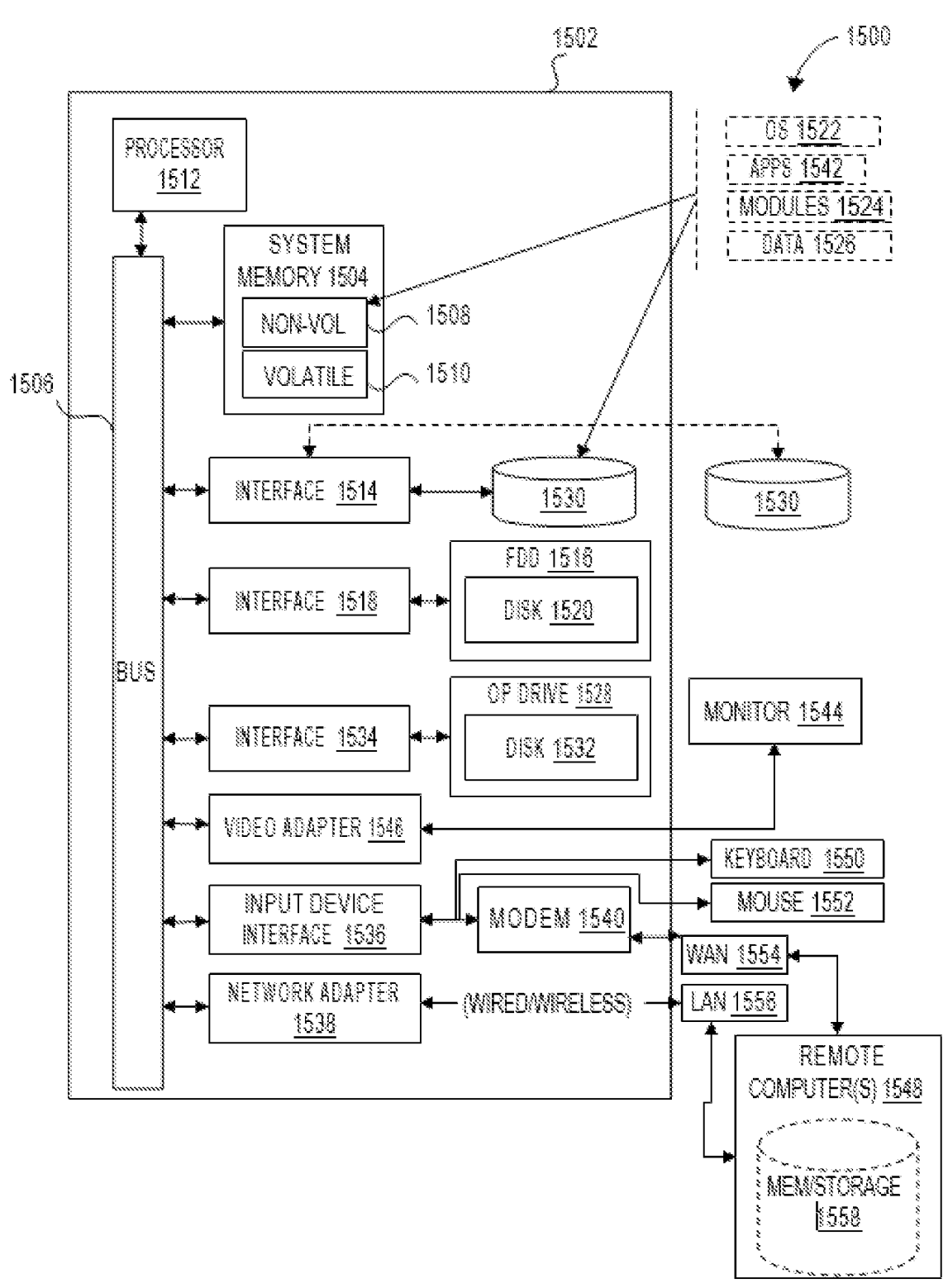
FIG. 15 illustrates an example of a computer architecture in accordance with one embodiment.

FIG. 15 illustrates an embodiment of an exemplary computer architecture 1500 suitable for implementing various embodiments as previously described. In one embodiment, the computer architecture 1500 may include or be implemented as part of one or more systems or devices discussed herein.

As used in this application, the terms "system" and "component" are intended to refer to a computer-related entity, either hardware, a combination of hardware and software, software, or software in execution, examples of which are provided by the exemplary computing computer architecture 1500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1500.

As shown in FIG. 15, the computing architecture 1500 includes a processor 1512, a system memory 1504 and a system bus 1506. The processor 1512 can be any of various commercially available processors.

The system bus 1506 provides an interface for system components including, but not limited to, the system memory 1504 to the processor 1512. The system bus 1506 can be any of several types of bus structure that may further interconnect to a memory bus (with or without a memory controller), a peripheral bus, and a local bus using any of a variety of commercially available bus architectures. Interface adapters may connect to the system bus 1506 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), Peripheral Component Interconnect (PCI) Express, Personal Computer Memory Card International Association (PCMCIA), and the like.

The computing architecture 1500 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1504 may include various types of computer-readable storage media in the form of one or more higher speed memory units, such as ROM, RAM, dynamic RAM (DRAM), Double-Data-Rate DRAM (DDRAM), synchronous DRAM (SDRAM), static RAM (SRAM), programmable ROM (PROM), erasable programmable ROM (EPROM), EEPROM, flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 15, the system memory 1504 can include non-volatile 1508 and/or volatile 1510. A basic input/output system (BIOS) can be stored in the non-volatile 1508.

A computer 1502 may include various types of computer-readable storage media in the form of one or more lower speed memory units, including an internal (or external) hard disk drive 1530, a magnetic disk drive 1516 to read from or write to a removable magnetic disk 1520, and an optical disk drive 1528 to read from or write to a removable optical disk 1532 (e.g., a CD-ROM or DVD). The hard disk drive 1530, magnetic disk drive 1516 and optical disk drive 1528 can be connected to system bus 1506 by a hard disk drive (HDD) interface, 1514, a floppy disk drive (FDD) interface 1518 and an optical disk drive interface 1534, respectively. The HDD interface 1514 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 1508, and volatile 1510, including an operating system 1522, one or more applications 1542, other program modules 1524, and program data 1526. In one embodiment, the one or more applications 1542, other program modules 1524, and program data 1526 can include, for example, the various applications and/or components of the systems discussed herein.

A user can enter commands and information into the computer 1502 through one or more wire/wireless input devices, for example, a keyboard 1550 and a pointing device, such as a mouse 1552. Other input devices may include microphones, infra-red (IR) remote controls, radio frequency (RF) remote controls, game pads, stylus pens, card readers, dongles, fingerprint readers, gloves, graphics tablets, joysticks, keyboards, retina readers, touch screens (e.g., capacitive, resistive, etc.), trackballs, track pads, sensors, styluses, and the like. These and other input devices are often connected to the processor 1512 through an input device interface 1536 that is coupled to the system bus 1506 but can be connected by other interfaces such as a parallel port, IEEE 1394 serial port, a game port, a USB port, an IR interface, and so forth.

A monitor 1544 or other type of display device is also connected to the system bus 1506 via an interface, such as a video adapter 1546. The monitor 1544 may be internal or external to the computer 1502. In addition to the monitor 1544, a computer typically includes other peripheral output devices, such as speakers, printers, and so forth.

The computer 1502 may operate in a networked environment using logical connections via wire and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory and/or storage device 1558 is illustrated. The logical connections depicted include wire/wireless connectivity to a LAN 1556 and/or larger networks, for example, a wide area network (WAN) 1554. Such LAN and WAN networking environments are commonplace in offices and companies and facilitate enterprise-wide computer networks, such as intranets, all of which may connect to a global communications network, for example, the Internet.

When used in a LAN 1556 networking environment, the computer 1502 is connected to the LAN 1556 through a wire and/or wireless communication network interface or network adapter 1538. The network adapter 1538 can facilitate wire and/or wireless communications to the LAN 1556, which may also include a wireless access point disposed thereon for communicating with the wireless functionality of the network adapter 1538.

When used in a WAN 1554 networking environment, the computer 1502 can include a modem 1540, is connected to a communications server on the WAN 1554 or has other means for establishing communications over the WAN 1554, such as by way of the Internet. The modem 1540, which can be internal or external and a wire and/or wireless device, connects to the system bus 1506 via the input device interface 1536. In a networked environment, program modules depicted relative to the computer 1502, or portions thereof, can be stored in the remote memory and/or storage device 1558. It will be appreciated that the network connections shown are exemplary and other means of establishing a communications link between the computers can be used.

The computer 1502 can be operable to communicate with wired and wireless devices or entities using the IEEE 802 family of standards, such as wireless devices operatively disposed in wireless communication (e.g., IEEE 802.11 over-the-air modulation techniques). This includes at least Wi-Fi, WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described herein may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, ASICs, PLDs, DSPs, field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The components and features of the devices described above may be implemented using any combination of discrete circuitry, ASICs, logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

FIG. 16 is a block diagram depicting an exemplary communications architecture 1600 suitable for implementing various embodiments as previously described. The communications architecture 1600 includes various common communications elements, such as a transmitter, receiver, transceiver, radio, network interface, baseband processor, antenna, amplifiers, filters, power supplies, and so forth. The embodiments, however, are not limited to implementation by the communications architecture 1600, which may be consistent with systems and devices discussed herein.

As shown in FIG. 16, the communications architecture 1600 includes one or more client(s) 1602 and server(s) 1604. The server(s) 1604 may implement one or more functions and embodiments discussed herein. The client(s) 1602 and the server(s) 1604 are operatively connected to one or more respective client data store 1606 and server data store 1608 that can be employed to store information local to the respective client(s) 1602 and server(s) 1604, such as cookies and/or associated contextual information.

The client(s) 1602 and the server(s) 1604 may communicate information between each other using a communication framework 1610. The communication framework 1610 may implement any well-known communications techniques and protocols. The communication framework 1610 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 1610 may implement various network interfaces arranged to accept, communicate, and connect to a communications network. A network interface may be regarded as a specialized form of an input/output (I/O) interface. Network interfaces may employ connection protocols including, without limitation, direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount of speed and capacity, distributed network controller architectures may similarly be employed to pool, load balance, and otherwise increase the communicative bandwidth required by client(s) 1602 and the server(s) 1604. A communications network may be any one and the combination of wired and/or wireless networks including, without limitation, a direct interconnection, a secured custom connection, a private network (e.g., an enterprise intranet), a public network (e.g., the Internet), a PAN, a LAN, a Metropolitan Area Network (MAN), an Operating Missions as Nodes on the Internet (OMNI), a WAN, a wireless network, a cellular network, and other communications networks.

What is claimed is:

1. A method comprising:
receiving, by a short-range communication antenna of a mobile device, a cryptogram from a contactless card while a first mobile application is running on the mobile device;
verifying, by a processor of the mobile device, the cryptogram; and
launching a second mobile application on the mobile device responsive to the cryptogram being verified for pulling information from the first mobile application that identifies an item in a shopping cart of the first mobile application, searching outside of the first mobile application to identify any available coupons associated with the item in the shopping cart of the first mobile application, and pushing the available coupons associated with the item in the shopping cart of the first mobile application to the first mobile application.

2. The method of claim 1 further comprising:
responsive to the first mobile application running on the mobile device, displaying, on a display screen of the mobile device, a solicitation for communication with the contactless card.

3. The method of claim 2 further comprising:
responsive to displaying, on the display screen of the mobile device, a payment screen associated with the first mobile application, displaying, on the display screen of the mobile device, the solicitation for the communication with the contactless card.

4. The method of claim 2 further comprising:
responsive to an item being placed in a shopping cart associated with the first mobile application, displaying, on the display screen of the mobile device, the solicitation for the communication with the contactless card.

5. The method of claim 1 further comprising:
successfully decrypting the cryptogram to verify the cryptogram.

6. The method of claim 5 further comprising:
decrypting protected data in the cryptogram;
comparing the protected data to record data associated with the contactless card; and
when the protected data matches the record data, verifying a customer associated with the contactless card.

7. The method of claim 1 further comprising:
transmitting the cryptogram from the mobile device to a server; and
receiving, at the mobile device, an indication from the server that the cryptogram is verified.

8. A non-transitory computer-readable medium comprising instructions that, when executed by a processor, cause the processor to:
receive, via a short-range communication antenna of a mobile device, a cryptogram from a contactless card while a first mobile application is executing on the mobile device;
verify the cryptogram; and
initiate a second mobile application on the mobile device responsive to the cryptogram being verified for pulling information from the first mobile application that identifies an item in a shopping cart of the first mobile application, searching outside of the first mobile application to identify any available coupons associated with the item in the shopping cart of the first mobile application, and pushing the available coupons associated with the item in the shopping cart of the first mobile application to the first mobile application.

9. The non-transitory computer-readable medium of claim 8, wherein, responsive to the first mobile application running on the mobile device, the instructions further cause the processor to display, on a display screen of the mobile device, a solicitation for communication with the contactless card.

10. The non-transitory computer-readable medium of claim 9, wherein, responsive to displaying, on the display screen of the mobile device, a payment screen associated with the first mobile application, the instructions further cause the processor to display, on the display screen of the mobile device, the solicitation for the communication with the contactless card.

11. The non-transitory computer-readable medium of claim 9, wherein, responsive to an item being placed in a shopping cart associated with the first mobile application, the instructions further cause the processor to display, on the display screen of the mobile device, the solicitation for the communication with the contactless card.

12. The non-transitory computer-readable medium of claim 8, wherein the instructions further cause the processor to successfully decrypt the cryptogram to verify the cryptogram.

13. The non-transitory computer-readable medium of claim 12, wherein the instructions further cause the processor to:
decrypt protected data in the cryptogram;
compare the protected data to record data associated with the contactless card; and when the protected data matches the record data, verify a customer associated with the contactless card.

14. The non-transitory computer-readable medium of claim 8, wherein the instructions further cause the processor to:

transmit the cryptogram from the mobile device to a server; and receive, at the mobile device, an indication from the server that the cryptogram is verified.

15. A mobile device comprising:

a short-range communication antenna;

a processor; and a memory storing instructions that, when executed by the processor, cause the processor to:

receive, via the short-range communication antenna, a cryptogram from a contactless card while the processor is running a first mobile application;

verify the cryptogram; and cause a second mobile application to execute on the processor responsive to the cryptogram being verified for pulling information from the first mobile application that identifies an item in a shopping cart of the first mobile application, searching outside of the first mobile application to identify any available coupons associated with the item in the shopping cart of the first mobile application, and pushing the available coupons associated with the item in the shopping cart of the first mobile application to the first mobile application.

16. The mobile device of claim 15 further comprising:

a display device, wherein the instructions further cause the processor to display, on the display device, a solicitation for communication with the contactless card responsive to the processor running the first mobile application.

* * * * *